United States Patent
Ahmed et al.

(10) Patent No.: US 12,079,071 B2
(45) Date of Patent: Sep. 3, 2024

(54) PROGRAMMABLE INITIAL PACKETS REJECTION IN A DISPLAY SYSTEM INTERFACE

(71) Applicant: QUALCOMM Incorporated, San Diego, CA (US)

(72) Inventors: Yasser Ahmed, San Diego, CA (US); Sachin Ajit Devamare, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 18/096,102

(22) Filed: Jan. 12, 2023

(65) Prior Publication Data

US 2024/0241782 A1    Jul. 18, 2024

(51) Int. Cl.
   *G06F 11/07*    (2006.01)

(52) U.S. Cl.
   CPC ...... *G06F 11/0793* (2013.01); *G06F 11/0745* (2013.01)

(58) Field of Classification Search
   CPC ............. G06F 11/0793; G06F 11/0745; G06F 11/1417; G06F 11/1438; G06F 11/1441
   See application file for complete search history.

(56) References Cited

U.S. PATENT DOCUMENTS

| | | | | |
|---|---|---|---|---|
| 6,424,625 B1 * | 7/2002 | Larsson | ................ | H04L 1/1806 370/410 |
| 10,834,057 B1 * | 11/2020 | Ferguson | .............. | H04L 69/166 |
| 2009/0023454 A1 * | 1/2009 | MacInnis | .............. | H04L 47/824 455/452.2 |
| 2017/0126812 A1 * | 5/2017 | Singhal | ................. | H04L 67/142 |
| 2020/0195589 A1 * | 6/2020 | Jain | ........................ | G09G 3/006 |
| 2021/0360090 A1 * | 11/2021 | Fader | .................... | G06F 9/4413 |

OTHER PUBLICATIONS

MIPI Alliance Specification for D-PHY May 14, 2009 http://www.jmrcubed.com/vr/ref_tech/mipi_d_phy_specification_v01-00-00.pdf (Year: 2009).*

(Continued)

*Primary Examiner* — Joseph O Schell
(74) *Attorney, Agent, or Firm* — Loza & Loza, LLP/Qualcomm

(57) ABSTRACT

A processing circuit coupled to an imaging device includes a bus interface circuit configured to communicatively couple the processing circuit to the imaging device over a multidrop differential serial link, detector circuits configured to detect a plurality of sequentially occurring signaling states of the multidrop differential serial link, the plurality of sequentially occurring signaling states related to transmissions of data packets over the multidrop differential serial link, and a controller. The controller is configured to discard data packets received after the imaging device is powered on or initialized and until the imaging device is indicated to be in an active operating state, count sequences of transitions between a first signaling state of the multidrop differential serial link and a second signaling state of the multidrop differential serial link, and indicate that the imaging device is in the active operating state after a preconfigured number of data packets have been discarded.

28 Claims, 12 Drawing Sheets

(56) References Cited

OTHER PUBLICATIONS

International Search Report and Written Opinion—PCT/US2023/083844—ISA/EPO—Mar. 20, 2024.
Lim K., et al., "A Multi-Lane MIPI CSI Receiver for Mobile Camera Applications", IEEE Transactions on Consumer Electronics, IEEE Service Center, New York, NY, US, vol. 56, No. 3, Aug. 2010, Sep. 30, 2010, pp. 1185-1190, XP011320015, p. 1-p. 2, Figure 1.

* cited by examiner

Example of a Camera Subsystem Interface

PROGRAMMABLE INITIAL PACKETS REJECTION IN A DISPLAY SYSTEM INTERFACE

TECHNICAL FIELD

The present disclosure relates generally to serial communication over a serial bus in a wireless communication device and, more particularly, to discarding erroneous data transmitted after initialization of a peripheral device.

BACKGROUND

Mobile communication devices typically include a variety of components such as circuit boards, integrated circuit (IC) devices, application-specific integrated circuit (ASIC) devices and/or System-on-Chip (SoC) devices. The types of components may include processing circuits, user interface components, storage and other peripheral components that communicate over a serial bus. The serial bus may be operated in accordance with a standardized or proprietary protocol. In one example, the serial bus can be operated in accordance with an Inter-Integrated Circuit (I2C or I$^2$C) communication protocol. The I2C bus is configured as a multi-drop bus and was developed to connect low-speed peripherals to a processor. The two wires of an I2C bus include a Serial Data Line (SDA) that carries a data signal, and a Serial Clock Line (SCL) that carries a clock signal.

In another example, the serial bus can be operated in accordance with a serial peripheral interface (SPI) communication protocol, in which a clock signal controls synchronous serial data exchanges between the master and subordinate devices. SPI protocols enable data to be communicated using two or more data lines of the serial bus and permits the serial bus to be configured for multidrop operation. Since one or more of the data lines may be shared by receiving devices, access to shared data lines is controlled using select signals provided to the devices coupled to the bus.

In another example, the serial bus can be operated in accordance with a multi-master protocol such that one or more devices may be a designated as a bus master or host device for the serial bus. A device may serve as a bus master or host in some transmissions and as a slave or subordinate device in other transmissions. In one example, Improved Inter-Integrated Circuit (I3C) protocols may be used to control operations on a serial bus. I3C protocols are defined by the Mobile Industry Processor Interface (MIPI) Alliance and derive certain implementation aspects from the I2C protocol. In another example, the Radio Frequency Front-End (RFFE) interface defined by the MIPI Alliance provides a communication interface for controlling various radio frequency (RF) front-end devices, including power amplifiers (PAS), low-noise amplifiers (LNAs), antenna tuners, filters, sensors, power management devices, switches, etc. These devices may be collocated in a single IC device or provided in multiple IC devices. Multiple antennas and radio transceivers may be provided in a mobile communication device to support multiple concurrent RF links. In another example, the system power management interface (SPMI) defined by the MIPI Alliance provides a hardware interface that may be implemented between baseband or application processors and peripheral components. The SPMI may be used to support power management and for other operations within a device or system.

Multiple standards are defined for interconnecting certain types of components in mobile communication devices. For example, there are multiple types of interfaces defined for communication between an application processor and display or camera components in a mobile communication device. Some components employ an interface that conforms to one or more standards or protocols specified by the MIPI Alliance, including standards and protocols for a camera serial interface (CSI) and a display serial interface (DSI).

The MIPI Alliance DSI, DSI-2 (referred to individually or collectively herein as DSI) and CSI and CSI-2 (referred to individually or collectively herein as CSI) standards define wired interfaces that can be deployed within an IC or between some combination of IC devices and SoC devices. CSI protocols may be used to couple a camera and application processor. DSI protocols may be used to couple an application processor and display subsystem. The low-level physical-layer (PHY) interface in each of these applications can be implemented in accordance with MIPI Alliance C-PHY or D-PHY standards and protocols. High-speed modes and low-power modes of communication are defined for C-PHY and D-PHY interfaces. The C-PHY high-speed mode uses a low-voltage multiphase signal transmitted in different phases on a 3-wire link. The D-PHY high-speed mode uses multiple 2-wire lanes to carry low-voltage differential signals. The low-power modes of C-PHY and D-PHY interfaces provide lower rates than the high-speed modes and transmit signals at higher voltages.

As device technology improves, increased functionalities may be serviced using serial buses configured for multidrop operation. However, multidrop serial buses are frequently required to support hot-join and hot-plugin capabilities that can disrupt ongoing communication over the multidrop serial bus. There is an ongoing need to improve the resilience and reliability of multidrop serial bus operations during disruptive events.

SUMMARY

Certain aspects of the disclosure relate to systems, apparatus, methods and techniques that enable mobile communication devices and other portable devices that can discard a number of data packets after an imaging device has been turned on. The number of discarded data packets may be calculated or configured to ensure that corrupted data packets are discarded before processing of the data packets commences.

In various aspects of the disclosure, a processing circuit coupled to an imaging device, includes a bus interface circuit configured to communicatively couple the processing circuit to the imaging device over a multidrop differential serial link, detector circuits configured to detect a plurality of sequentially occurring signaling states of the multidrop differential serial link, the plurality of sequentially occurring signaling states related to transmissions of data packets over the multidrop differential serial link, and a controller. The controller may be configured to discard data packets received after the imaging device is powered on or initialized and until the imaging device is indicated to be in an active operating state, count sequences of transitions between a first signaling state of the multidrop differential serial link and a second signaling state of the multidrop differential serial link, and indicate that the imaging device is in the active operating state after a preconfigured number (N) of data packets have been discarded.

In various aspects of the disclosure, a method for operating a processing circuit coupled to an imaging device includes configuring a bus interface circuit to communicatively couple the processing circuit to the imaging device over a multidrop differential serial link; detecting a plurality of sequentially occurring signaling states of the multidrop differential serial link, the plurality of sequentially occurring signaling states related to transmissions of data packets over the multidrop differential serial link, discarding data packets received after the imaging device is powered on or initialized and until the imaging device is indicated to be in an active operating state, counting sequences of transitions between a first signaling state of the multidrop differential serial link and a second signaling state of the multidrop differential serial link, and indicating that the imaging device is in the active operating state after a preconfigured number (N) of data packets have been discarded.

In various aspects of the disclosure, an apparatus includes means for configuring a bus interface circuit to communicatively couple the apparatus to an imaging device over a multidrop differential serial link, means for detecting a plurality of sequentially occurring signaling states of the multidrop differential serial link, the plurality of sequentially occurring signaling states related to transmissions of data packets over the multidrop differential serial link, and means for counting sequences of transitions between a first signaling state of the multidrop differential serial link and a second signaling state of the multidrop differential serial link. Data packets received after the imaging device is powered on or initialized are discarded until the imaging device is indicated to be in an active operating state. The imaging device is indicated to be in the active operating state after a preconfigured number (N) of data packets have been discarded.

In various aspects of the disclosure, a processor-readable storage medium includes code that, when executed by a processing circuit, causes the processing circuit to configure a bus interface circuit to communicatively couple the processing circuit to an imaging device over a multidrop differential serial link, detect a plurality of sequentially occurring signaling states of the multidrop differential serial link, the plurality of sequentially occurring signaling states related to transmissions of data packets over the multidrop differential serial link, discard data packets received after the imaging device is powered on or initialized and until the imaging device is indicated to be in an active operating state, count sequences of transitions between a first signaling state of the multidrop differential serial link and a second signaling state of the multidrop differential serial link, and indicate that the imaging device is in the active operating state after a preconfigured number (N) of data packets have been discarded.

DETAILED DESCRIPTION

Figure 1:
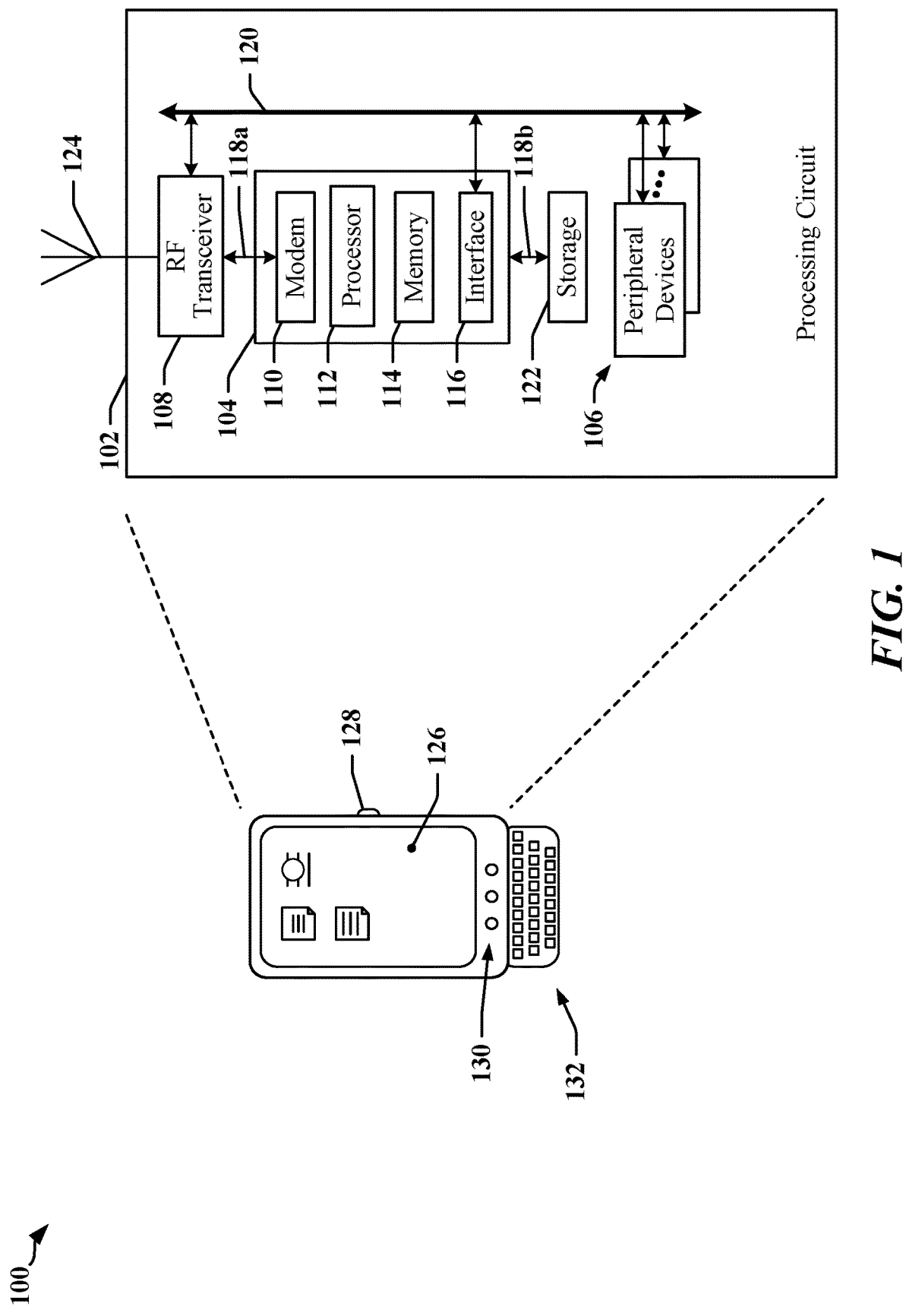
FIG. 1 illustrates an apparatus employing a data link between IC devices and that is selectively operated according to a standard or proprietary protocol.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Data communication links employed by SoCs and other IC devices to connect processors with modems and other peripherals may be operated in accordance with industry or proprietary standards or protocols associated with certain functions or types of devices. In the example of display panels, display subsystems, and display drivers, communication standards and protocols defined by the MIPI Alliance are frequently used. The Display Serial Interface (DSI®), for example, provides C-PHY and D-PHY standards and protocols used to define, configure and control a high-speed serial interface between a host processor and a display module. Control and management protocols may be used to operate other serial buses that couple the host processor and display module may include SPMI, I2C, I3C and/or protocols.

Mobile communication handsets typically support low-power modes of operation that can be initiated when the handset is idle. In conventional handsets that use DSI protocols to manage certain serial data links, there is little difference between high-speed and low-power modes of operation of the serial data links. Accordingly, it can be difficult or impossible to permit a processor in a host device that includes a serial data link or related circuits to enter a low-power mode when the handset is idle and DSI protocols are used to manage serial data link. According to certain aspects of this disclosure, data communication between a host device and a display driver can be transferred to a low-power serial data link when low-power mode is activated. The DSI physical layer circuits can be idled and the processor in the host device can enter a sleep mode.

Examples of Apparatus that Employ Serial Data Links

According to certain aspects of the disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that employs a data communication bus. The apparatus 100 may include a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable communication between two or more devices 104, 106, and/or 108. In one example, the ASIC 104 may include one or more bus interface circuits 116 that includes a combination of circuits, counters, timers, control logic and other configurable circuits or modules. In one example, the bus interface circuits 116 may be configured to operate in accordance with standards-defined communication specifications or protocols. The processing circuit 102 may include or control a power management function that configures and manages the operation of the apparatus 100.

Figure 2:
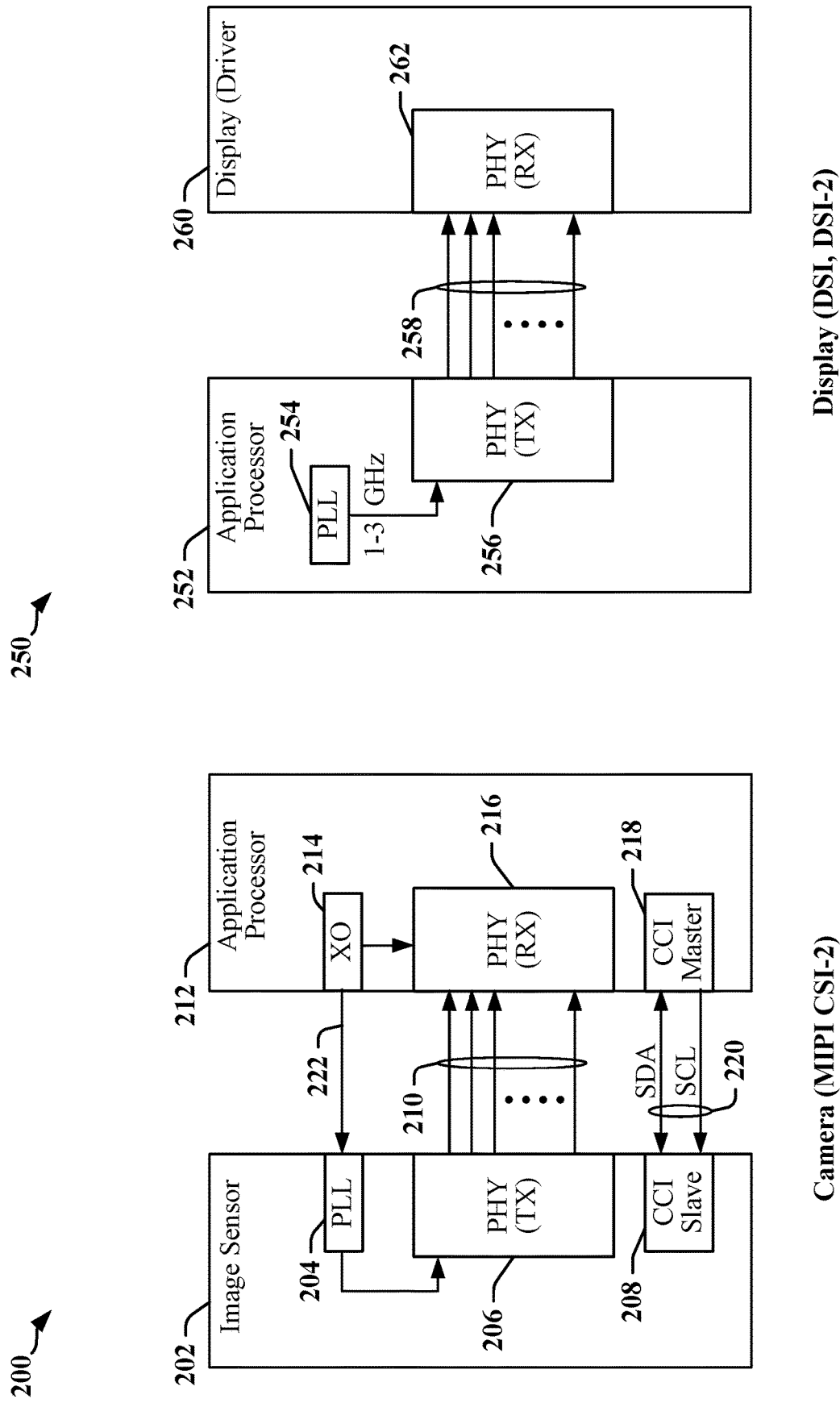
FIG. 2 illustrates examples of interface circuits that may be adapted in accordance with certain aspects of this disclosure.

FIG. 2 illustrates examples of interface circuits that may be employed or adapted in accordance with certain aspects of this disclosure. A first interface circuit is configured as a camera subsystem 200 and a second interface circuit is configured as a display subsystem 250. The interface circuits may be deployed in a mobile communication device, for example. The camera subsystem 200 may include a CSI-2 defined communication link between an image sensor 202 and an application processor 212. The communication link may include a high-data rate data transfer link 210 used by the image sensor 202 to transmit image data to the application processor 212 using a transmitter 206. The high-data rate data transfer link 210 may be configured and operated according to D-PHY or C-PHY protocols. The application processor 212 may include a crystal oscillator (XO 214) or other clock source to generate a clock signal 222 that controls the operation of the transmitter 206. The clock signal 222 may be processed by a phase-locked loop (PLL) 204 in the image sensor 202. In some instances, the clock signal 222 may also be used by the D-PHY or C-PHY receiver 216 in the application processor 212. The communication link may include a Camera Control Interface (CCI), which is similar in nature to the Inter-Integrated Circuit (I2C) interface. The CCI bus may include a Serial Clock (SCL) line that carries a clock signal and a Serial Data (SDA) line that carries data. The CCI link 220 may be bidirectional and may operate at a lower data rate than the high-data rate data transfer link 210. The CCI link 220 may be used by the application processor 212 to exchange control and configuration information with the image sensor 202. The application processor 212 may include a CCI bus master PHY 218 and the image sensor 202 may include a CCI subordinate PHY 208.

The display subsystem 250 may include a unidirectional data link 258 that can be configured and operated according to D-PHY or C-PHY protocols. In the application processor 252, a clock source such as the PLL 254 may be used to generate a bit clock signal used by a D-PHY or C-PHY receiver 256 to control transmissions on the data link 258. At the display driver 260, a D-PHY or C-PHY receiver 262 may extract embedded clock information from sequences of symbols transmitted on the data link, or from a clock lane provided in the data link 258.

Certain aspects disclosed herein relate to systems, apparatus and methods that support a broad range of interface protocols, and that can operate using different physical media. As shown in FIG. 2, for example, the camera subsystem 200 and/or display subsystem 250 may communicate high data rate information using D-PHY or C-PHY protocols. In some configurations, the camera subsystem 200 and/or display subsystem 250 may communicate using a reverse channel (e.g., the CCI link 220) for configuration of an image sensor 202 or other device. In some instances, a low-power mode of operation may be defined for links that use either D-PHY or C-PHY protocols.

Figure 3:
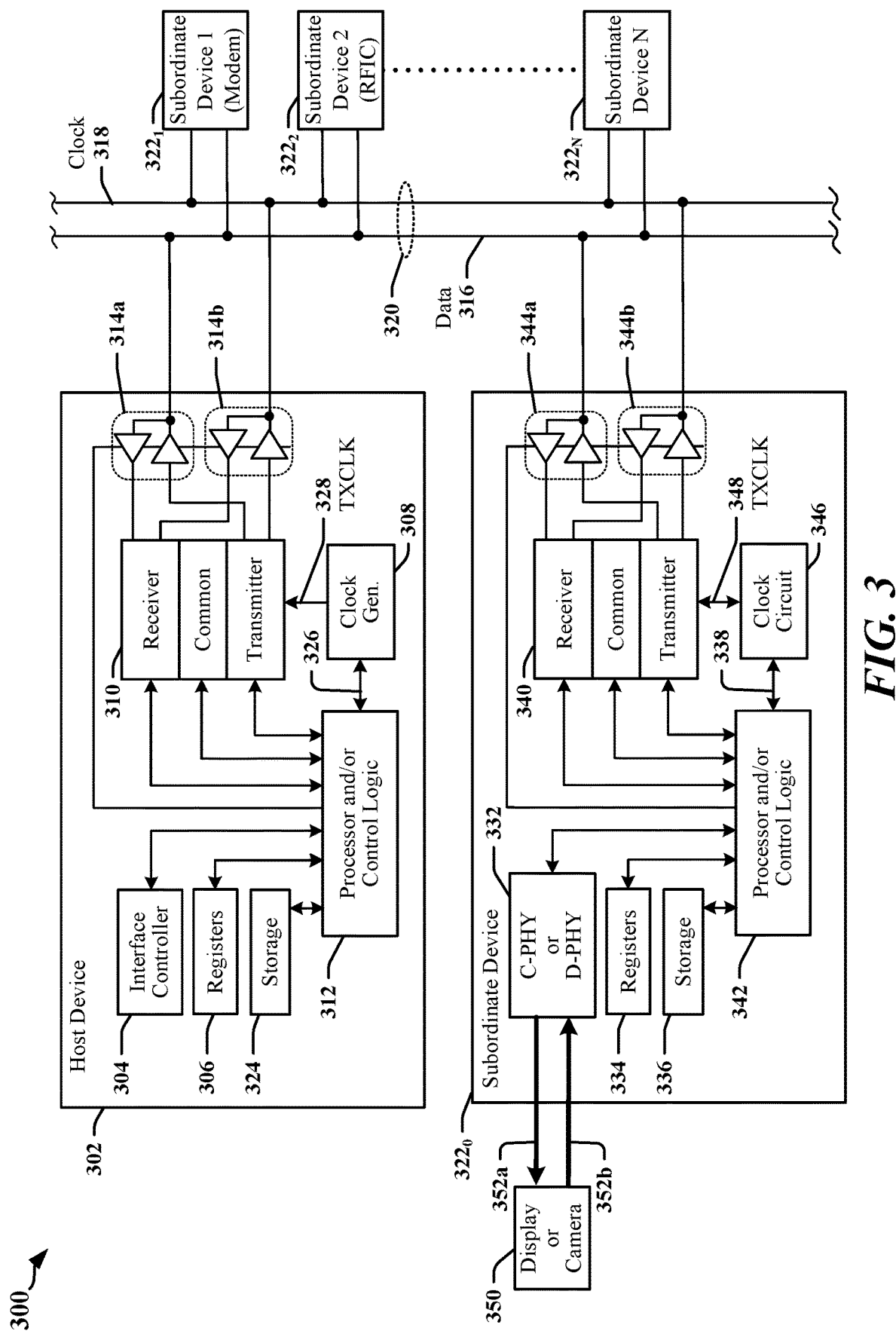
FIG. 3 illustrates a system architecture for an apparatus employing a data link between IC devices.

FIG. 3 illustrates an example of an apparatus 300 employing a data link that may be used to communicatively couple two or more devices, subcomponents or circuits. Here, the apparatus 300 includes multiple devices 302, and $322_0$-$322_N$ coupled to a two-wire serial bus 320. The devices 302 and $322_0$-$322_N$ may be implemented in one or more semiconductor IC devices, such as an application processor, SoC or ASIC. In various implementations certain of the devices 302 and $322_0$-$322_N$ may include, support or operate as a modem, a signal processing device, a display driver, a camera, a user interface, a sensor, a sensor controller, a media player, a transceiver, and/or other such components or devices. In some examples, one or more devices $322_0$-$322_N$ may be used to control, manage or monitor a sensor device. Communication between devices 302 and $322_0$-$322_N$ over the serial bus 320 is controlled by a host device 302. Certain types of bus can support multiple bus masters 302.

In one example, a host device 302 may include an interface controller 304 that may manage access to the serial bus, configure dynamic addresses for subordinate devices and/or generate a clock signal 328 to be transmitted on a clock line 318 of the serial bus 320. The host device 302 may include configuration registers 306 or other storage 324, and other control logic 312 configured to handle protocols and/or higher-level functions. The control logic 312 may include a processing circuit such as a state machine, sequencer, signal processor or general-purpose processor. The host device 302 includes a transceiver 310 and line drivers/receivers 314a and 314b. The transceiver 310 may include receiver, transmitter and common circuits, where the common circuits may include timing, logic and storage circuits and/or devices. In one example, the transmitter encodes and transmits data based on timing in the clock signal 328 provided by a clock generation circuit 308. Other timing clocks 326 may be used by the control logic 312 and other functions, circuits or modules.

At least one device $322_0$-$322_N$ may be configured to operate as a subordinate device on the serial bus 320 and may include circuits and modules that support a display, an image sensor, and/or circuits and modules that control and communicate with one or more sensors that measure environmental conditions. In one example, a device $322_0$ configured to operate as a subordinate device may provide a control function, physical layer circuit 332 that includes circuits and modules to support a display, an image sensor, and/or circuits and modules that control and communicate with one or more sensors that measure environmental conditions. In this example, the device $322_0$ can include configuration registers 334 or other storage 336, control logic 342, a transceiver 340 and line drivers/receivers 344a and 344b. The control logic 342 may include a processing circuit such as a state machine, sequencer, signal processor or general-purpose processor. The transceiver 340 may include receiver, transmitter and common circuits, where the common circuits may include timing, logic and storage circuits and/or devices. In one example, the transmitter encodes and transmits data based on timing in a clock signal 348 provided by clock generation and/or recovery circuits 346. In some instances, the clock signal 348 may be derived from a signal received from the clock line 318. Other timing clocks 338 may be used by the control logic 342 and other functions, circuits or modules.

The serial bus 320 may be operated in accordance with RFFE, I2C, I3C, SPI, SPMI or another suitable protocol. In some instances, two or more devices 302, $322_0$-$322_N$ may be configured to operate as a host device on the serial bus 320. In some instances, the apparatus 300 includes multiple serial buses 320, 352a and/or 352b that couple two or more of the devices 302, $322_0$-$322_N$ or one of the devices 302, $322_0$-$322_N$ and a peripheral device such as a display or camera 350 or a Radio-Frequency IC (RFIC). In some examples, one subordinate device $322_0$ is configured to operate as a display or camera coupled to a display or camera 350. The latter subordinate device $322_0$ may include a physical layer circuit 332 that is configured to operate as a C-PHY or D-PHY interface controller that communicates with the display or camera 350 over a serial bus 352a or 352b operated in accordance with a C-PHY protocol or a D-PHY protocol.

In certain aspects of this disclosure, systems and apparatus may employ multi-phase data encoding and decoding interface methods for communicating between IC devices. A multi-phase encoder may drive a plurality of conductors (i.e., 3 conductors). Each conductor may be referred to as a wire, although the conductors may include conductive traces on a circuit board or traces or interconnects within a conductive layer of a semiconductor IC device. In one example, a physical layer interface implemented using MIPI Alliance-defined C-PHY technology and protocols (i.e., a C-PHY interface) may be used to connect camera or display to an application processor. The C-PHY interface employs three-phase symbol encoding to transmit data symbols on 3-wire lanes, or "trios" where each trio includes an embedded clock. A trio may be referred to as a lane herein. A multi-lane C-PHY communication channel may be established using multiple trios to carry data exchanged between a pair of devices, where each channel includes one trio that carries a portion of the data, which may be independently encoded in accordance with C-PHY protocols.

The C-PHY interface provides a three-phase encoding scheme for a three-wire system may define three phase states and two polarities, providing 6 states and 5 possible transitions from each state. Deterministic voltage and/or current changes may be detected and decoded to extract data from the three wires.

Figure 4:
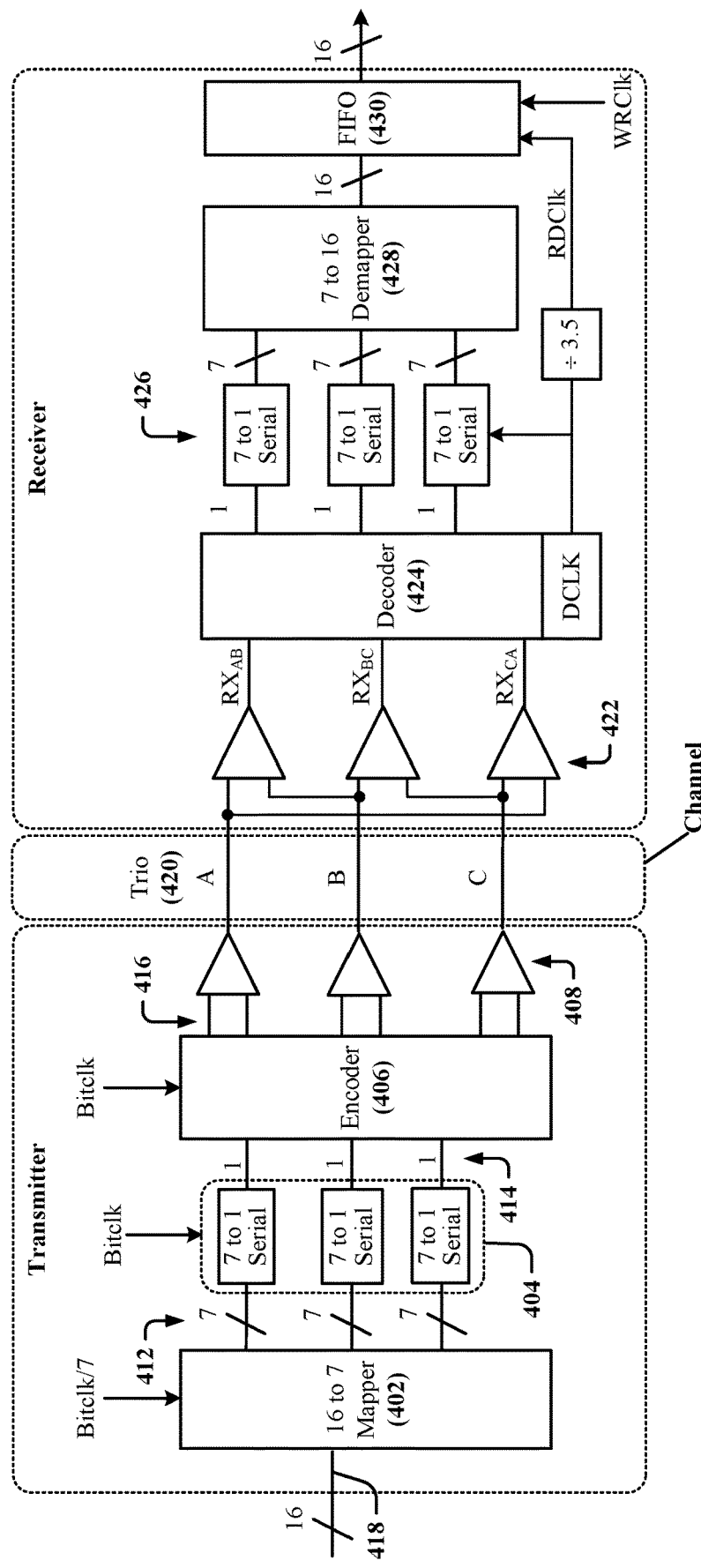
FIG. 4 illustrates an example of a C-PHY interface that may be adapted according to certain aspects disclosed herein.

FIG. 4 illustrates a C-PHY interface 400 that may be used to implement certain aspects of the serial bus 352a or 352b depicted in FIG. 3. The illustrated example may relate to a three-wire link configured to carry three-phase polarity encoded data in accordance with DSI protocols. The use of 3-phase polarity encoding provides for high-speed data transfer and may consume half or less of the power of other interfaces at the desired operating frequency because fewer than 3 drivers are active at any time in a C-PHY link. The C-PHY interface 400 uses 3-phase polarity encoding to encode multiple bits per symbol transition on the three-wire link. In one example, a combination of three-phase encoding and polarity encoding may be used to support a wide video graphics array (WVGA), 80 frames per second liquid crystal display driver IC without a frame buffer, delivering pixel data for display refresh at 810 Mbps over three or more wires.

In the depicted C-PHY interface 400, three-phase polarity encoding is used to control signaling state of connectors, wires, traces and other interconnects that provide a channel for communication. In the illustrated example, a single unidirectional channel, or lane, is provided using a combination of three wires (the trio 420). Each wire in the trio 420 may be undriven, driven positive, or driven negative in any symbol transmission interval. In some instances, an undriven signal wire of the trio 420 may be in a high-impedance state. In some instances, an undriven signal wire of the trio 420 may be driven or pulled to a voltage level that lies substantially halfway between the positive and negative voltage levels provided on driven signal wires. In some instances, an undriven signal wire of the trio 420 may have no current flowing through it. Drivers 408 coupled to the signal wires of the trio 420 are controlled such that only one wire of the trio 420 is in each of three states (denoted as +1, −1, or 0) in each symbol interval.

In one example, drivers 408 may include unit-level current-mode drivers. In another example, drivers 408 may drive opposite polarity voltages on two signals transmitted on two signal wires of the trio 420 while the third signal wire is at high impedance and/or pulled to ground. For each transmitted symbol interval, at least one signal is in the undriven (0) state, while one signal is driven to the positive (+1 state) and one signal is driven to the negative (−1 state), such that the sum of current flowing to the receiver is always zero. For each symbol, the state of at least one signal wire of the trio 420 is changed from the symbol transmitted in the preceding transmission interval.

In the C-PHY interface 400, a mapper 402 may receive a 16-bit input data word 418, and the mapper 402 may map the input data word 418 to 7 symbols 412 for transmitting sequentially over the signal wires of the trio 420. An M-wire, N-phase encoder 406 configured for three-wire, three-phase encoding receives the 7 symbols 412 produced by the mapper one input symbol 414 at a time and computes the state of each signal wire of the trio 420 for each symbol interval, based on the immediately preceding state of the signal wires of the trio 420. The 7 symbols 412 may be serialized using parallel-to-serial converters 404, for example. The encoder 406 provides control signals 416 to define the outputs of the drivers 408. The encoder 406 selects the states of the signal wires of the trio 420 based on the input symbol 414 and the previous states of signal wires of the trio 420 and may provide control signals 416 to cause the drivers 408 to produce the desired signaling state on the trio 420.

The use of three-wire, three-phase encoding permits several bits to be encoded in a plurality of symbols where the bits per symbol is not an integer. In the example of a three-wire, three-phase system, there are 3 available combinations of 2 wires, which may be driven simultaneously, and 2 possible combinations of polarity on the simultaneously driven pair of wires, yielding 6 possible states. Since each transition occurs from a current state, 5 of the 6 states are available at every transition. With 5 states, $\log_2(5) \cong 2.32$ bits may be encoded per symbol transition. Accordingly, a mapper may accept a 16-bit word and convert it to 7 symbols because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

A receiver in the C-PHY interface 400 includes comparators 422 and a decoder 424 that are configured to provide a digital representation of the state of each of three signal wires of the trio 420, as well as the change in the state of the three signal wires compared to the state transmitted in the previous symbol period. Seven consecutive states are assembled by serial-to-parallel convertors 426 and used to produce a set of 7 symbols to be processed by a demapper 428 to obtain 16 bits of data that may be buffered in a first-in-first-out (FIFO) storage device 430, which may be implemented using registers, for example.

According to certain aspects disclosed herein, systems and apparatus may employ some combination of differential and single-ended encoding for communicating between IC devices. In one example, the MIPI Alliance-defined "D-PHY" physical layer interface technology may be used to connect camera and display devices to an application processor. The D-PHY interface can switch between a differential (High-Speed) mode and a single-ended low-power (LP) mode in real time as needed to facilitate the transfer of large amounts of data or to conserve power and prolong battery life. The D-PHY interface is capable of operating in simplex or duplex configuration with single data lane or multiple data lanes with a unidirectional clock lane driven by a host device. In one example, a data lane is implemented using a single wire. Single-wire lanes may be used at lower data rates that are used to generate data signals that can be transmitted with limited losses such that a receiver can readily decode the data carried over the data lane. Two-wire lanes that carry differentially encoded clock and data signals provide common mode rejection of electromagnetic interference and can limit attenuation of higher frequency components in signals transmitted over the lanes.

Figure 5:
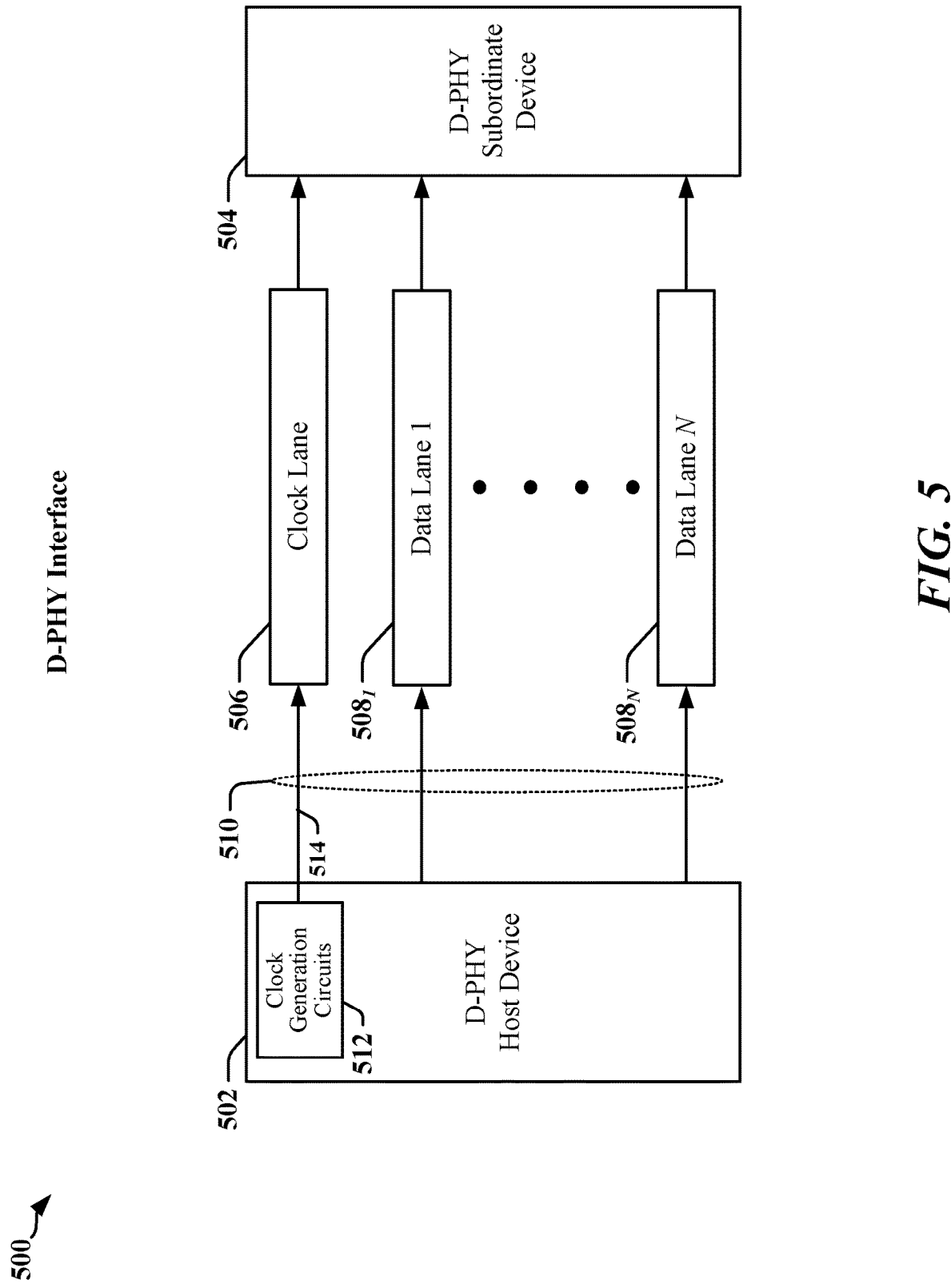
FIG. 5 illustrates an example of a D-PHY interface that may be adapted according to certain aspects disclosed herein.

FIG. 5 illustrates a generalized example of a D-PHY interface 500 that includes a host device 502 and a subordinate device 504 coupled using a set of wires 510 that are used to provide a clock lane 506 and one or more data lanes $508_1$-$508_N$. For high-speed operation, the clock lane 506 and the data lanes $508_1$-$508_N$ may each be provided using a pair of wires to carry a differential signal. In one example, the subordinate device 504 is provided in a display driver IC (DDIC) associated with a display panel, and the host device 502 is included in an application processor or provided by another processing circuit.

In the illustrated example, a clock signal is transmitted on a clock lane 506 and data is transmitted in one or more data lanes $508_1$-$508_N$. The host device 502 includes clock generation circuits 512 that can be configured to generate a clock signal 514 that is transmitted over the clock lane 506 to control transmissions over the data lanes $508_1$-$508_N$. The frequency of the clock signal 514 may be configured during system initialization or configuration and/or may be dynamically configured based on mode of operation of the D-PHY interface 500, application needs, volumes of data to be transferred and power conservation needs. The number of data lanes $508_1$-$508\backslash$ that are provided or that are active in a device may be configured during system initialization or configuration and/or may be dynamically configured based on mode of operation of the D-PHY interface 500, application needs, volumes of data to be transferred and power conservation needs.

Figure 6:
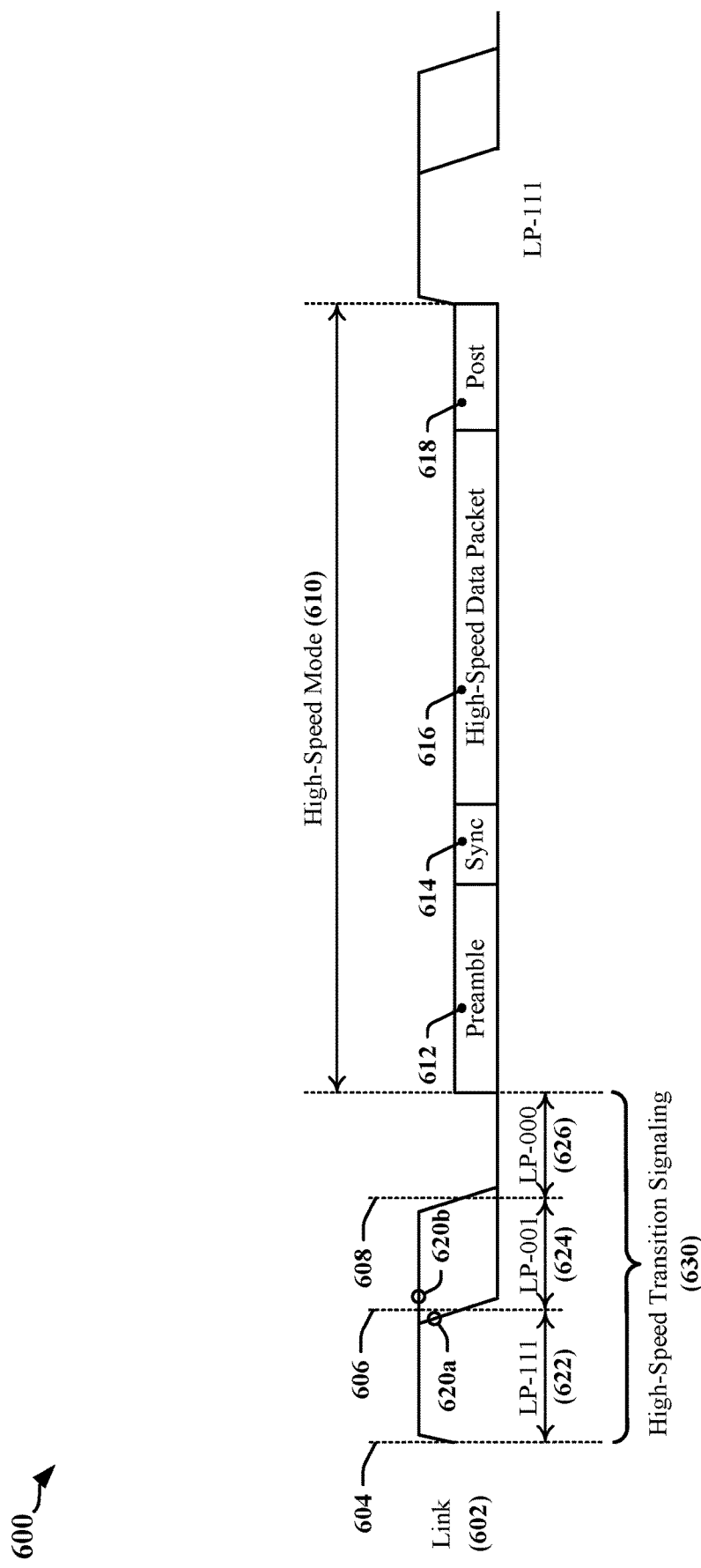
FIG. 6 illustrates signaling associated with transmission of a high-speed data burst over a data communication link operated in accordance with DSI protocols.

FIG. 6 illustrates an example of signaling associated with transmission of a high-speed data burst on a data communication link 602 operated in accordance with DSI protocols. While the timing diagram 600 illustrates data packet transmission in accordance with C-PHY protocols certain general concepts also apply to D-PHY protocols, including the signaling used to transition between high-speed and low-power modes of operation. A high-speed transaction is illustrated, and high-speed mode is initiated by high-speed transition signaling 630. At a first point in time 604, the data communication link 602 is being operated in low-power mode and a transition to high-speed mode is initiated by the LP-111 signaling state 622 in which each of the wires of at least one differential channel are driven to a high signaling state. At a second point in time 606, the LP-001 signaling state 624 is entered when one wire of the differential channel (e.g., the noninverted wire 602a in a D-PHY channel) is driven to a low signaling state while another wire of the differential channel (e.g., the inverted wire 602b in the D-PHY channel) is maintained in the high signaling state. At a third point in time 608, the LP-000 signaling state 626 is entered when all wires of the differential channel are driven to a low signaling state. This startup sequence causes a receiving device to enter high-speed mode and prepare for synchronization and/or one or more data packets. In the high-speed mode 610, low-voltage differential signaling is used. With respect to the illustrated example, C-PHY protocols define a 3-phase differential signaling scheme.

The illustrated high-speed data transmission includes a data packet 616 and control signaling including training, synchronization and termination signaling. In accordance with C-PHY protocols, for example, a data packet 616 is preceded in transmission by a preamble 612 and a Sync Word 614 and the data transmission is terminated by the POST pattern 618. The POST pattern 618 is provided at the end of a high-speed data transmission to provide a reliable notification of the end of a high-speed burst to the receiver.

Figure 7:
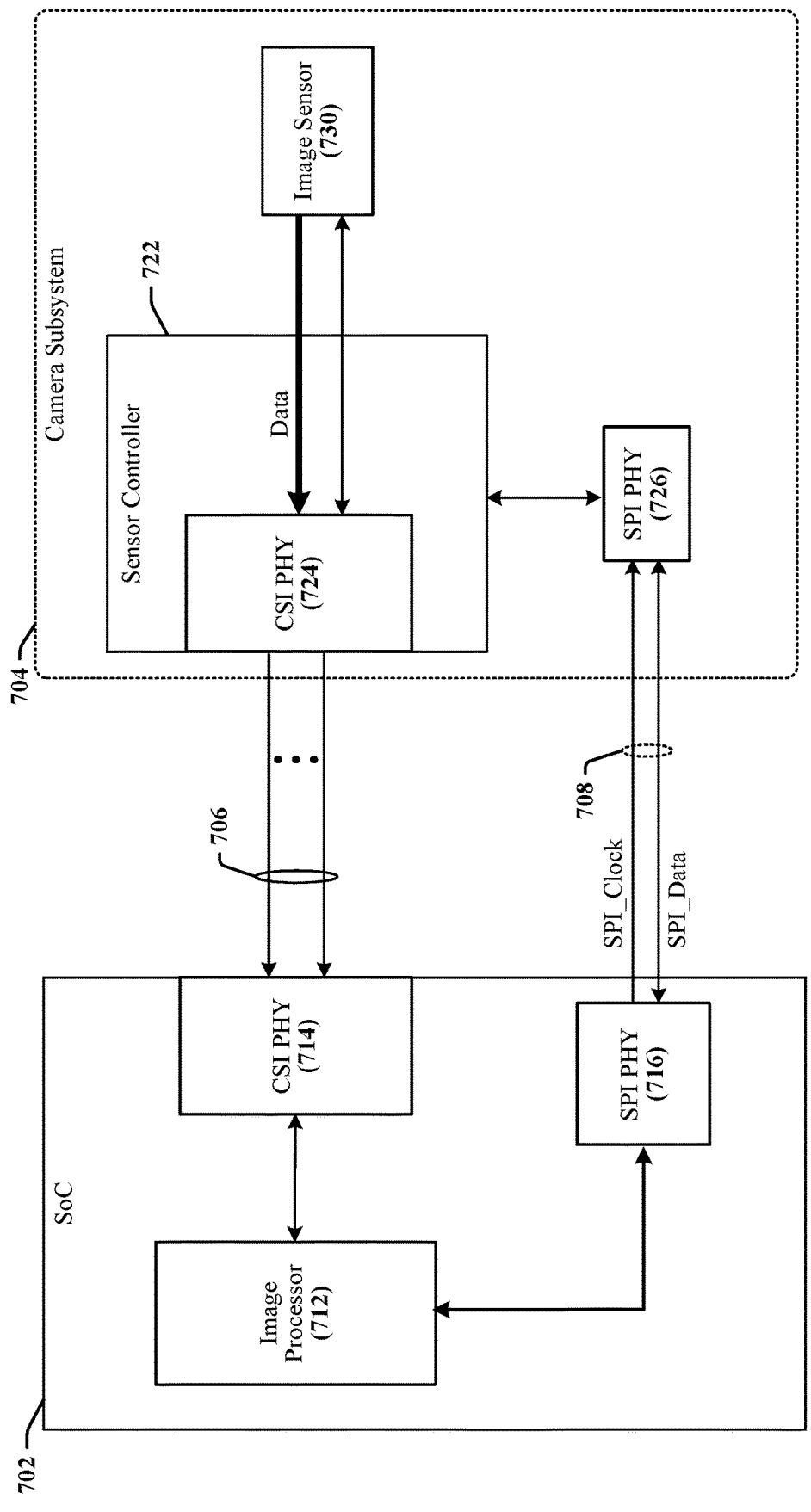
FIG. 7 illustrates an example in which a system that includes an imaging device utilizes a CSI data link in accordance with certain aspects of this disclosure.

FIG. 7 illustrates one application in which a system 700 that includes an imaging device utilizes a CSI data link in accordance with certain aspects of this disclosure. The illustrated system 700 includes an SoC 702 and a camera subsystem 704 that are communicatively coupled using a high-speed serial bus 706 and a low-power serial bus 708. In the illustrated example, the SoC 702 may include multiple processors, including a central processing unit or image processor 712, one or more microcontrollers, digital signal processors, finite state machines or other sequential logic. For the purposes of this disclosure, examples of high-speed serial data links may be described as being controlled and managed using CSI protocols, while examples of low-speed serial data links may be described as being controlled and managed using SPI protocols. In other examples, other types of communication protocols can be used to control or manage high-speed serial data links and low-speed serial data links. In the illustrated example, the SoC 702 includes a CSI physical interface (the CSI PHY 714) and an SPI physical interface (the SPI PHY 716).

The camera subsystem 704 includes in a sensor controller 722 that may be configured to control and configure the operation of an image sensor 730. The sensor controller 722 may include one or more processing circuits including, for example, one or more microcontrollers, digital signal processors, finite state machines or other sequential logic. The sensor controller 722 may include a CSI physical interface (the CSI PHY 724) configured as a transmitting interface that is coupled to the high-speed serial bus 706. The illustrated sensor controller 722 also includes a low-power serial bus 708. A SPI physical interface (SPI PHY 726) in the camera subsystem 704 may be coupled to the SPI PHY 716 in the SoC 702 through the low-power serial bus 708 and may be configured to support bidirectional, full-duplex operation.

Figure 8:
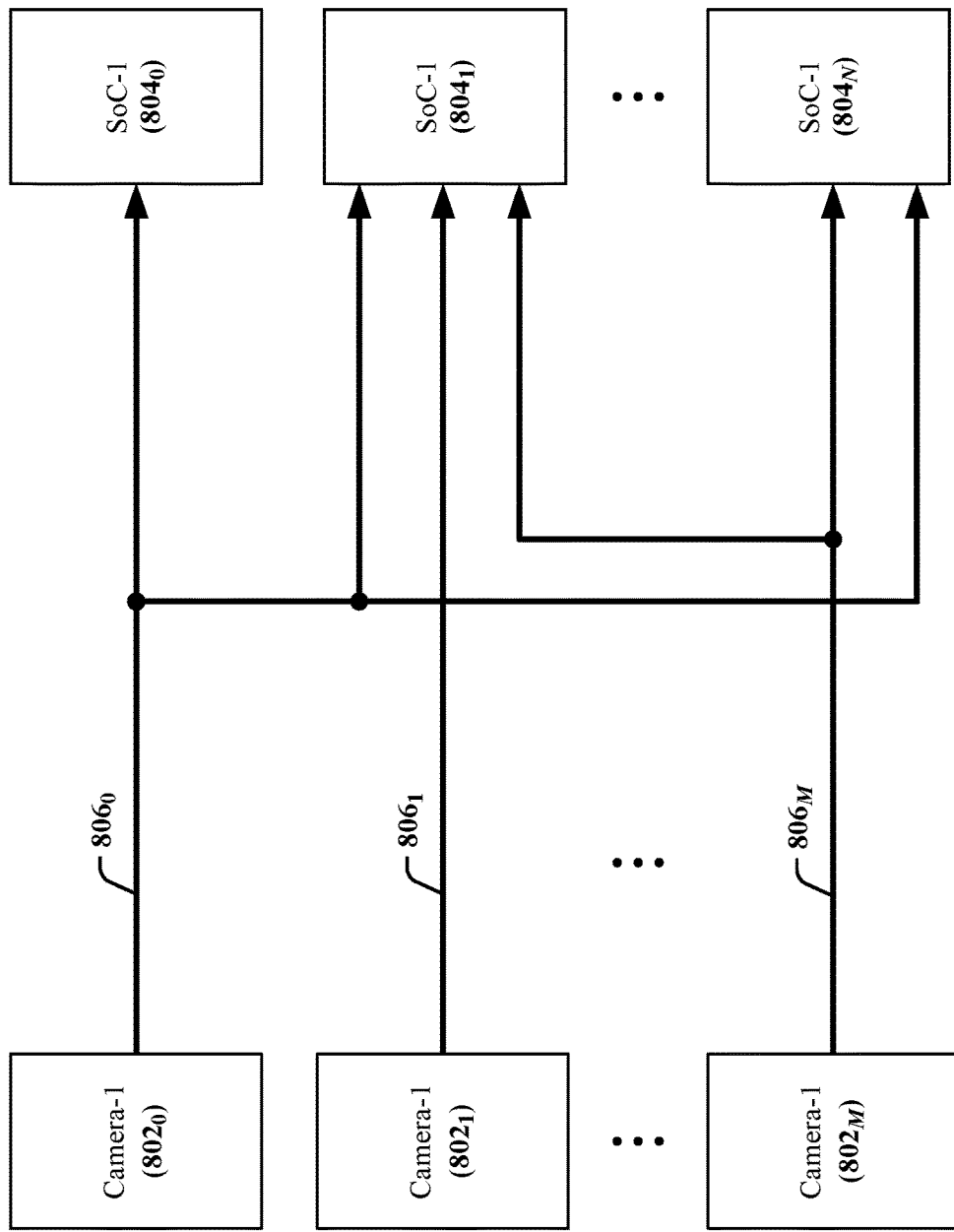
FIG. 8 illustrates a system in which multidrop CSI data links are used.

The capabilities and applications of the CSI and DSI data links defined by the MIPI Alliances continue to evolve. For example, a CSI data link may be implemented as a multidrop datalink in certain applications. FIG. 8 illustrates a system 800 in which multidrop CSI data links are used. In one example, the system 800 may be deployed in automotive applications, where multiple cameras $802_0$-$802_M$ can transmit image data to multiple application processors or SoCs $804_0$-$804_N$. In the illustrated example, each camera $802_0$-$802_M$ transmits image data over a corresponding multidrop CSI data link $806_0$-$806_N$. In some instances, one of the cameras $802_0$-$802_M$ may transmit a datastream to one of the SoCs $804_0$-$804_N$ that hosts an application configured to provide assistance to a driver when parking a vehicle, and this camera may be one of several of the SoCs $804_0$-$804_N$ that are used by a guidance system during autonomous operation of a vehicle. In some instances, various cameras $802_0$-$802_M$ may transmit a datastream to one or more of the SoCs $804_0$-$804_N$ that are used for managing vehicle security, including for access control and/or to support anti-theft systems. In some instances, images produced one or more of the cameras $802_0$-$802_M$ can be transmitted concurrently multiple SoCs $804_0$-$804_N$ or application processors that cooperate to provide redundant autonomous driving capabilities, where each of the SoCs $804_0$-$804_N$ can reliably operate when one or more of the other $804_0$-$804_N$ fail, produce erroneous or invalid results or enter an idle state. Multidrop CSI data links $806_0$-$806_M$ can be used to support these and other implementations in which a single camera $802_0$-$802_M$ can be monitored by multiple $804_0$-$804_N$. The application processors, SoCs or other video processors that receive a datastream from one or more may be referred to herein as video processing circuits, regardless of whether the application processor, SoCs or other video processors use, modify or operate on the datastream or merely relay the datastream to another device. Certain aspects of this disclosure provide systems, circuits, methods and techniques for managing multidrop CSI or DSI data links. In one aspect, systems, apparatus and methods are disclosed that can detect invalid transmissions that can occur during camera system initialization, including during hot-join, or hot-plugin control events. The initialization of camera systems that are configured to communicate in accordance with MIPI Alliance protocols can be time consuming and can cause disrupt communication on a multidrop CSI data link. It is common for image sensors to transmit some invalid data packets during system initialization, and many manufacturers of image sensors can indicate the number of invalid data packets to be expected during initialization. The number of invalid data packets may be empirically or from simulation. The invalid data packets can corrupt or disrupt the operation of a camera subsystem and/or image processors that receive the invalid data packets.

A system that uses a CSI data link to couple a camera to processing device may be configured in accordance with certain aspects of this disclosure to reject or discard a number of data packets received after a camera subsystem is powered on and/or initialized. The processing device may be included in an SoC. The processing device may be an imaging processor or an application processor. The processing device may be a communication processor configured to relay an image datastream. In some instances, the processing device may receive notification of current or impending power on and/or initialization of a camera subsystem. In some instances, the processing device may infer, deduce or otherwise calculate that a power on and/or initialization of a camera subsystem is in progress or impending based on detection of a hot-plugin or hot-join event or based on signaling received from the camera subsystem or an application processor.

A hot-plugin event may occur when, for example, a camera sensor is turned on or otherwise becomes active and begins streaming data over a CSI data link. The CSI PHY circuits in the camera sensor may disrupt or otherwise affect signaling over the CSI data link as it is powered on or becomes active. A hot-join event may occur when an active camera sensor enables decoders and other circuits in its CSI PHY circuits to transmit a datastream from the CSI data link, and such activation can disrupt or otherwise affect signaling over the CSI data link and may activate the CSI PHY circuits in a manner that causes indeterminate states to exist within the CSI PHY circuits. For the purposes of this description, examples will be discussed in relation to camera subsystem power on and/or initialization events that are affirmatively indicated or determined based on errors or disruptions detected on a CSI data link.

A receiving device configured in accordance with certain aspects of this disclosure can be configured to respond to the occurrence or likely occurrence of camera subsystem power on and/or initialization. In one aspect, the receiving device can be configured to ignore, reject or discard a preconfigured number of data packet transmitted after power on and/or initialization of the camera subsystem. The number of data packet to be ignored, rejected or discarded may be determined based on manufacturer specifications, calibration, simulation and/or empirical measurements obtained from prior power-on or initializations of the camera subsystem or of a similarly functioning system. In certain implementations, the receiving device is configured to closely monitor the high-speed transition signaling 630 illustrated in FIG. 6 in order to determine when a hot-plugin event is a likely source for physical link errors.

Figure 9:
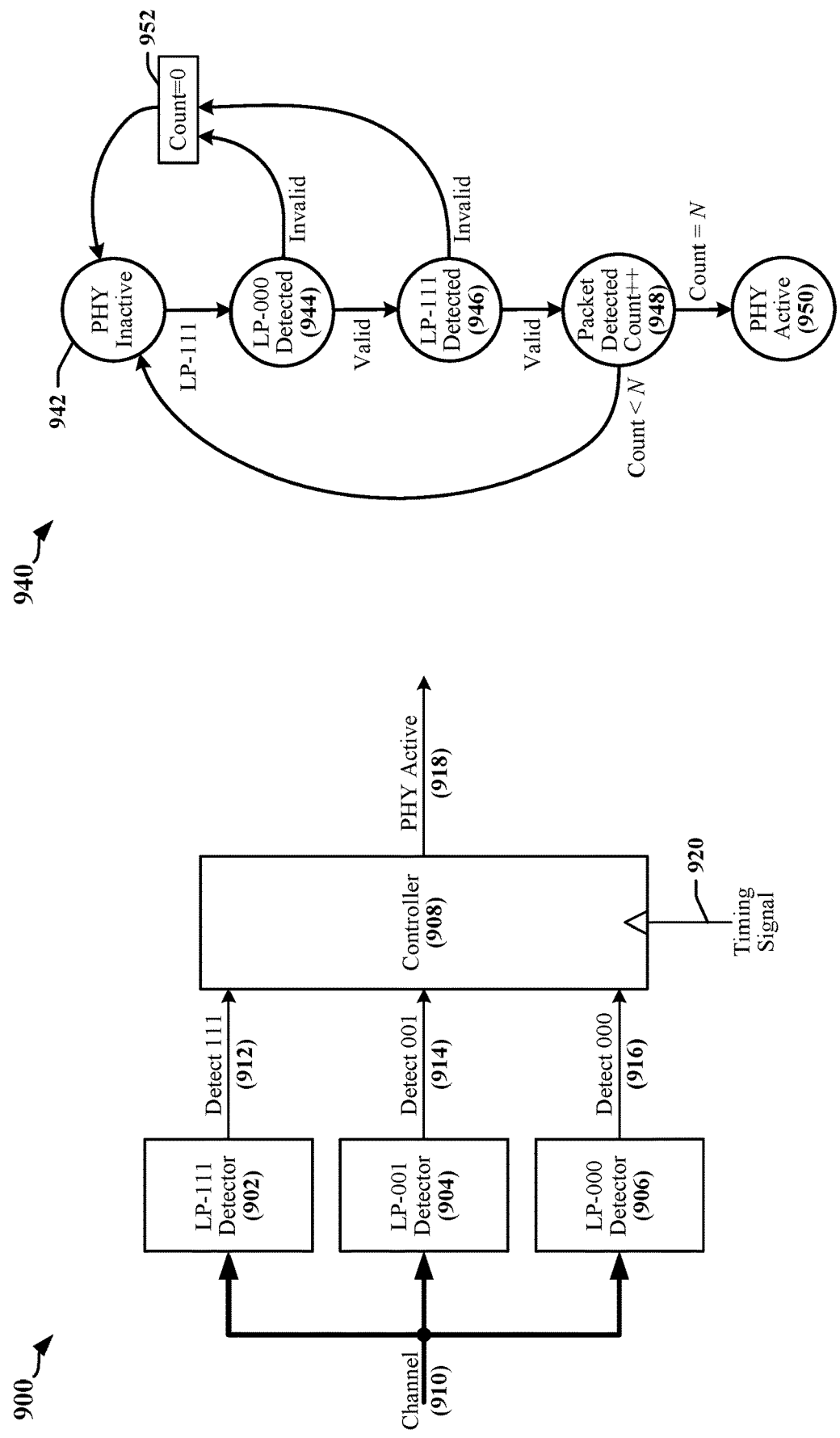
FIG. 9 illustrates the rejection of data packets or other transmissions after power on or initialization of a camera subsystem in a system configured in accordance with certain aspects of this disclosure.

FIG. 9 illustrates the rejection of data packets or other transmissions after power on or initialization of a camera subsystem in a system configured in accordance with certain aspects of this disclosure. FIG. 9 includes a block diagram 900 and a state diagram 940. In the block diagram 900, a controller 908 is configured to monitor the outputs 912, 914, 916 of a set of detectors 902, 904, 906 that monitor a channel 910 of the CSI data link to detect occurrence of corresponding elements of the high-speed transition signaling 630 illustrated in FIG. 6. A first detector 902 is configured to detect the occurrence of an LP-111 signaling state 622, a second detector 904 is configured to detect the occurrence of an LP-001 signaling state 624, and a third detector 906 is configured to detect the occurrence of an LP-000 signaling state 626. In the illustrated example, the controller 908 is configured to count a number (N) of transitions from a valid LP-000 signaling state 626 to a valid LP-111 signaling state 622. In some instances, the controller 908 may be configured to count a number of occurrences of the high-speed transition signaling 630 that are followed by a valid LP-111 signaling state 622.

In one example, the controller 908 may be implemented as a Finite State Machine (FSM) and may receive a timing signal 920 that enables the controller 908 to measure the durations of each of the LP-111 signaling state 622, the LP-001 signaling state 624, and the LP-000 signaling state 626. The controller 908 may measure the durations of the LP-111 signaling state 622, the LP-001 signaling state 624, and the LP-000 signaling state 626 by counting cycles or half-cycles of the timing signal 920 while the measured state is present on the CSI data link. In some instances, the timing signal 920 is derived from the transmitter clock signal used to control transmissions of data over the CSI data link. In some instances, the timing signal 920 is a real-time clock signal or other internal clock signal. The controller may determine the validity of each of the LP-111 signaling state 622, the LP-001 signaling state 624, and the LP-000 signaling state 626 based on measured durations of the LP-111 signaling state 622, the LP-001 signaling state 624, and the LP-000 signaling state 626. A state may be determined to be valid if it has a duration that exceeds a minimum duration defined for the state. In some instances, a state may be determined to be valid if it has a duration that does not exceed a maximum duration defined for the state. The controller may assert a PHY active signal 918 to enable the CSI PHY 714 (see FIG. 7) to receive and process data packets after the configured number (N) of LP-000 signaling state 626 to LP-111 transitions have been counted. The nominal, minimum and maximum durations for the LP-111 signaling state 622, the LP-001 signaling state 624, and the LP-000 signaling state 626 may be defined by protocol, by application, during system configuration and/or during system initialization.

The number (N) of LP-000 signaling state 626 to LP-111 signaling state 622 transitions may be configured by application and/or during configuration or initialization of the receiving device. In certain implementations, the controller 908 may be configured to assert the PHY active signal 918 after a configurable number of LP-000 signaling state 626 to LP-111 signaling state 622 transitions. In some implementations, counting of LP-000 signaling state 626 to LP-111 signaling state 622 transitions may be disabled and the PHY active signal 918 may be asserted whenever the CSI PHY 714 in the receiver has been initialized and is active. In some implementations, the camera subsystem 704 may be configured to suppress transmission of the configured number (N) of transitions from a valid LP-000 signaling state 626 to a valid LP-111 signaling state 622 after camera subsystem 704 experiences a power on or initialization event.

The state diagram 940 may be implemented by the controller 908 regardless of whether the controller 908 or the detectors 902, 904, 906 measure the durations of the LP-111 signaling state 622, the LP-001 signaling state 624, and the LP-000 signaling state 626. The controller 908 may be collocated with the image sensor 730 in the camera subsystem 704 and may be configured to cause the CSI PHY 724 to suppress a preconfigured number (N) of data packets. The controller 908 may be located in the receiving device, such as the SoC 702, and the controller 908 may be configured to discard a preconfigured number (N) of data packets.

The controller 908 may initially de-assert the PHY active signal 918 to cause the CSI PHY circuits, and then enter a PHY inactive state 942. The controller 908 may reset a counter that is configured to count transitions from a valid LP-000 signaling state 626 to a valid LP-111 signaling state 622 before entering the PHY inactive state 942. In the illustrated example, the counter is incremented for each detected transition from a valid LP-000 signaling state 626 to a valid LP-111 signaling state 622. The CSI PHY circuits or the controller 908 may reject, discard or ignore data packets while the controller 908 is in the PHY inactive state 942 and/or until the controller 908 is indicated to have entered a PHY active state 950.

Upon detecting an LP-000 signaling state 626 the controller 908 enters an LP-000 detected state 944 and waits for the next LP-111 signaling state 622. In some implementations, the controller 908 may reset the counter at block 952 and reenter the PHY inactive state 942 if the LP-000 signaling state 626 is determined to be invalid, based on the duration of the LP-000 signaling state 626, or when an invalid sequence of states occurs before the next LP-111 signaling state 622 is detected.

Upon detecting an LP-111 signaling state 622 the controller 908 transitions to an LP-111 detected state 946. The controller 908 may reset the counter at block 952 and reenter the PHY inactive state 942 if the LP-111 signaling state 622 is determined to be invalid, based on the duration of the LP-111 signaling state 622. Provided the LP-111 signaling state 622 is valid, the controller 908 transitions to a packet detected state 948. In the packet detected state 948, the controller 908 may increment the counter. If the counter has reached the preconfigured number N, the controller 908 may configure the CSI PHY circuits for normal operation before transitioning to the PHY active state 950. The controller may assert the PHY active signal 918 when it enters the PHY active state 950. Data packets received while the controller 908 is in the PHY active state 950 are processed according to protocol. If the counter has not reached the preconfigured number N after being incremented in the packet detected state 948, the controller 908 may return to the PHY inactive state 942 and wait for the next LP-000 signaling state 626.

In accordance with certain aspects of this disclosure, the number of transitions from a LP-000 signaling state 626 to a LP-111 signaling state 622 that are counted before the image sensor is indicated or considered to be active may be dynamically configured. The number of transitions may correspond to or correlate with a number of data packets that are discarded or suppressed. In some implementations different numbers of data packets may be discarded or suppressed when different image sensors or types of image sensor are powered-up or initialized. In some instances, an image processor or application processor may be configured such that no data packets are discarded or suppressed. In some implementations, the number of data packets to be discarded or suppressed may be changed after initial configuration. In one example, corrupted data packets may be detected after the configured number of data packets have been discarded or suppressed and the display subsystem or a related processing circuit may be configured to discard or suppress a larger number of data packets in subsequent image sensor power-up or initialization events.

Examples of Processing Circuits and Methods

Figure 10:
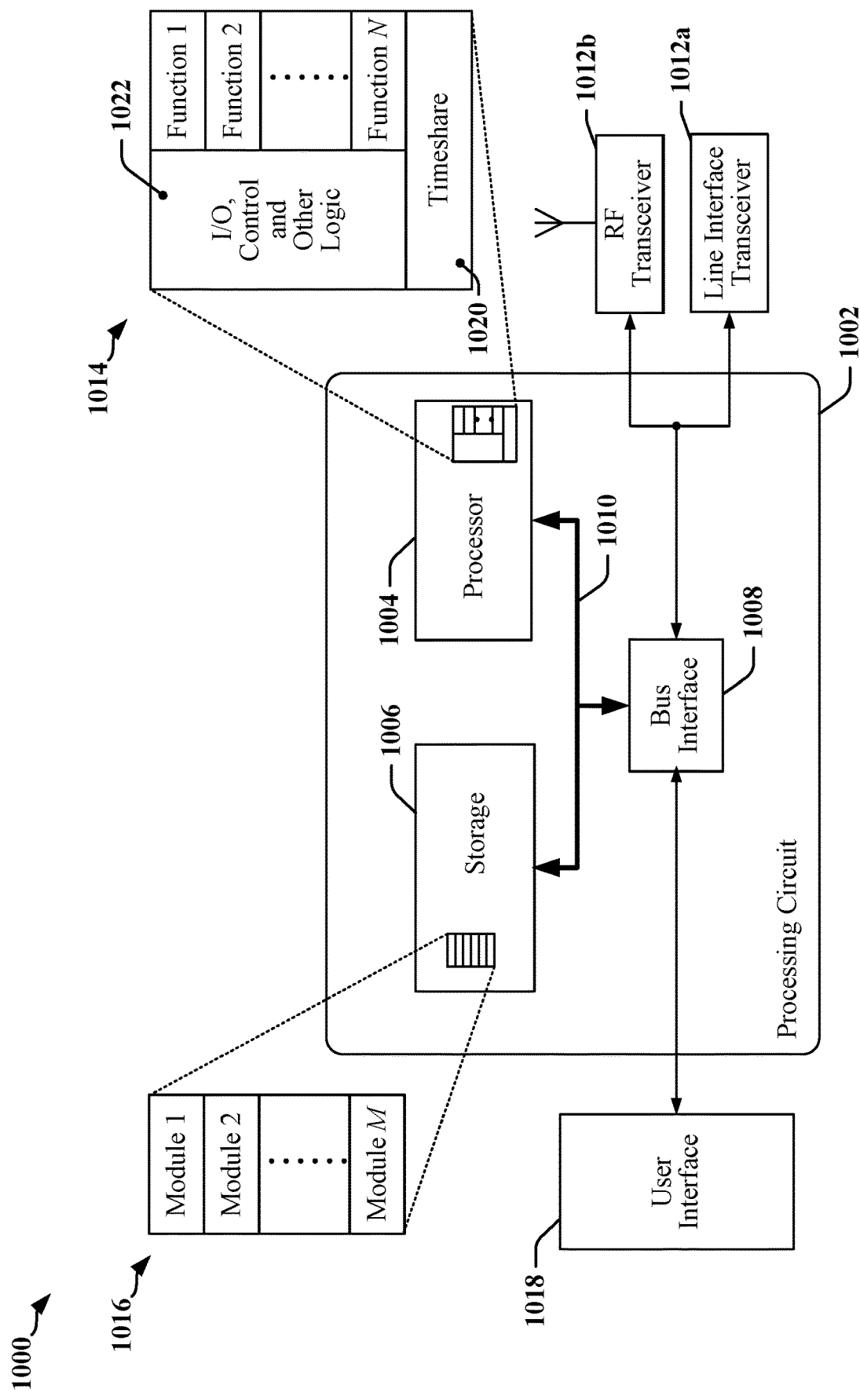
FIG. 10 illustrates one example of an apparatus employing a processing circuit that may be adapted in accordance with certain aspects disclosed herein.

FIG. 10 is a diagram illustrating an example of a hardware implementation for an apparatus 1000. In some examples, the apparatus 1000 may perform one or more functions disclosed herein. In accordance with various aspects of the disclosure, an element, or any portion of an element, or any combination of elements as disclosed herein may be implemented using a processing circuit 1002. The processing circuit 1002 may include one or more processors 1004 that are controlled by some combination of hardware and software modules. Examples of processors 1004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012a, 1012b. A transceiver 1012a, 1012b may be provided for each networking technology supported by the processing circuit. In some instances, multiple networking technologies may share some or all of the circuitry or processing modules found in a transceiver 1012a, 1012b. Each transceiver 1012a, 1012b provides a means for communicating with various other apparatus over a transmission medium. In one example, a transceiver 1012a may be used to couple the apparatus 1000 to a multi-wire bus. In another example, a transceiver 1012b may be used to connect the apparatus 1000 to a radio access network. Depending upon the nature of the apparatus 1000, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement certain methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer-readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as a transceiver 1012a, 1012b, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to a transceiver 1012a, 1012b, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012a, 1012b, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Figure 11:
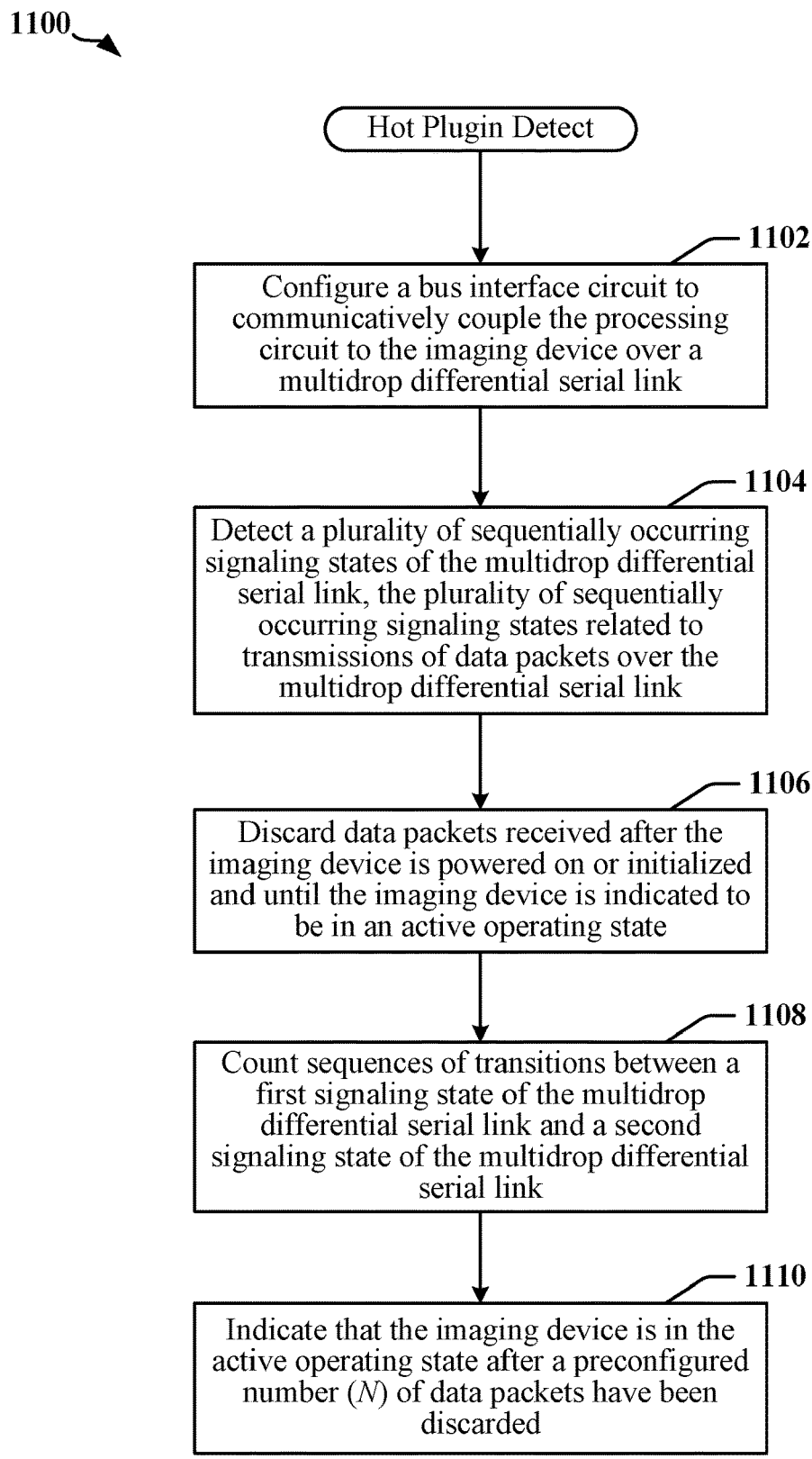
FIG. 11 is a flowchart that illustrates a method for operating a bus interface circuit in accordance with certain aspects disclosed herein.

FIG. 11 is a flowchart 1100 of a method for operating a processing circuit coupled to an imaging device and configured in accordance with certain aspects of this disclosure. At block 1102 in the illustrated method, a bus interface circuit may be configured to communicatively couple the processing circuit to the imaging device over a multidrop differential serial link. At block 1104 in the illustrated method, a plurality of sequentially occurring signaling states of the multidrop differential serial link may be detected. The plurality of sequentially occurring signaling states may be related to transmissions of data packets over the multidrop differential serial link. At block 1106 in the illustrated method, data packets received after the imaging device is powered on or initialized are discarded until the imaging device is indicated to be in an active operating state. At block 1108 in the illustrated method, sequences of transitions between a first signaling state of the multidrop differential serial link and a second signaling state of the multidrop differential serial link are counted. At block 1110 in the illustrated method, the imaging device is indicated to be in the active operating state after a preconfigured number (N) of data packets have been discarded.

In certain implementations, the first signaling state indicates a beginning of high-speed transmission over the multidrop differential serial link and the second signaling state indicates a termination of high-speed transmission over the multidrop differential serial link. The first signaling state may correspond to an LP-000 signaling state defined by a protocol specified by the MIPI Alliance. The second signaling state may correspond to an LP-111 signaling state defined by the protocol specified by the MIPI Alliance. A data packet may be received over the multidrop differential serial link between each transition from the first signaling state of to the second signaling state.

In some examples, the number of data packets to be discarded is defined based on manufacturer specifications for the imaging device. The number of data packets to be discarded may be defined based on calibration or empirical results obtained from initialization of the imaging device.

In some implementations, each signaling state in the plurality of sequentially occurring signaling states is validated based on duration of the each signaling state. The counting of the sequences of transitions may be reset and/or restarted when one of the plurality of sequentially occurring signaling states is determined to be invalid.

Figure 12:
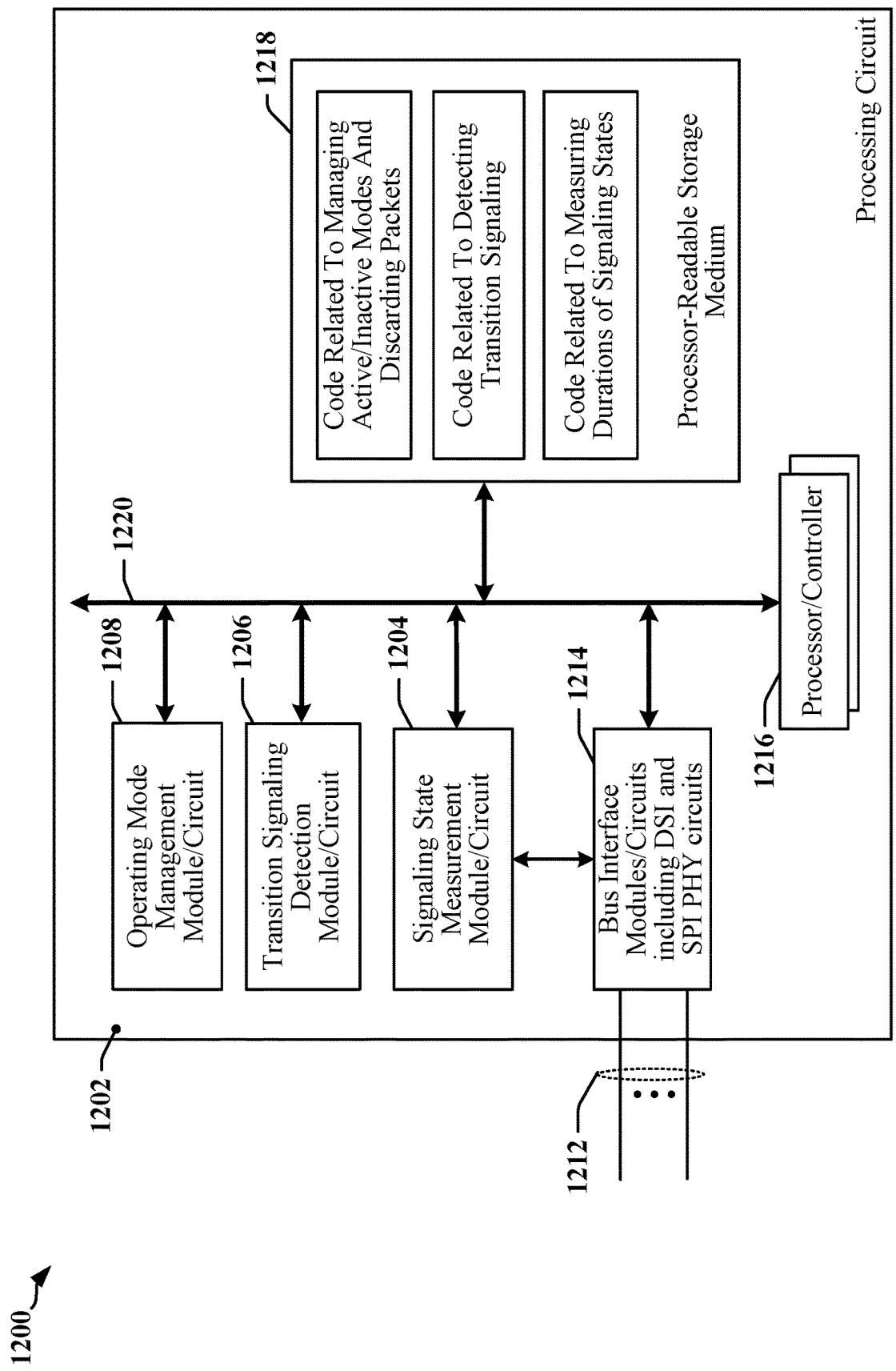
FIG. 12 illustrates a first example of a hardware implementation for a bus interface apparatus adapted in accordance with certain aspects disclosed herein.

FIG. 12 is a diagram illustrating a first example of a hardware implementation for an apparatus 1200 employing a processing circuit 1202. The processing circuit typically has one or more microprocessors, microcontrollers, digital signal processors, sequencers and/or state machines, represented generally by the processors 1216. The processing circuit 1202 may be implemented with a bus architecture, represented generally by the bus 1220. The bus 1220 may include any number of interconnecting buses and bridges depending on the specific application of the processing circuit 1202 and the overall design constraints. The bus 1220 links together various circuits including multiple processors 1216, the modules or circuits 1204, 1206 and 1208 and the processor-readable storage medium 1218. A bus interface circuit and/or module 1214 may be provided to support communications over multiple serial links 1212. The bus 1220 may also link various other circuits such as timing sources, peripherals, voltage regulators, and power management circuits, which are well known in the art, and therefore, will not be described any further.

The processors 1216 may be responsible for general processing, including the execution of software, code and/or instructions stored on the processor-readable storage medium 1218. The processor-readable storage medium 1218 may include a non-transitory storage medium. The software, when executed by the processors 1216, causes the processing circuit 1202 to perform the various functions described supra for any particular apparatus. The processor-readable storage medium may be used for storing data that is manipulated by the processors 1216 when executing software. The processing circuit 1202 further includes at least one of the modules 1204, 1206 and 1208. The modules 1204, 1206 and 1208 may be software modules running in the processors 1216, resident/stored in the processor-readable storage medium 1218, one or more hardware modules coupled to the processors 1216, or some combination thereof. The modules 1204, 1206 and 1208 may include microcontroller instructions, state machine configuration parameters, or some combination thereof.

In one configuration, the apparatus 1200 includes modules and/or circuits 1204 adapted to measure durations of signaling states of a multidrop differential serial link, modules and/or circuits 1206 adapted to detect a sequence of signaling states that corresponds to transition signaling, and modules and/or circuits 1208 adapted to manage transitions between operating modes, including high-speed and low-power modes. Managing transitions between operating modes may include controlling or configuring a signal that indicates when the imaging device is operating in a normal, nominal or active operating state.

The apparatus 1200 may include means for configuring a bus interface circuit to communicatively couple the apparatus to an imaging device over a multidrop differential serial link, means for detecting a plurality of sequentially occurring signaling states of the multidrop differential serial link, and means for counting sequences of transitions between a first signaling state of the multidrop differential serial link and a second signaling state of the multidrop differential serial link. The plurality of sequentially occurring signaling states may relate to or indicate transmissions of data packets over the multidrop differential serial link. Data packets received after the imaging device is powered on or initialized may be discarded until the imaging device is indicated to be in an active operating state. The imaging device may be indicated to be in the active operating state after a preconfigured number (N) of data packets have been discarded.

In certain implementations, the first signaling state indicates a beginning of high-speed transmission over the multidrop differential serial link. The second signaling state may indicate a termination of high-speed transmission over the multidrop differential serial link. The first signaling state may correspond to an LP-000 signaling state defined by a protocol specified by the MIPI Alliance and the second signaling state corresponds to an LP-111 signaling state defined by the protocol specified by the MIPI Alliance. A data packet may be received over the multidrop differential serial link between each transition from the first signaling state of to the second signaling state.

In some examples, the number of data packets to be discarded is defined based on manufacturer specifications for the imaging device. In some examples, the number of data packets to be discarded is defined based on calibration or empirical results obtained from initialization of the imaging device.

The means for detecting a plurality of sequentially occurring signaling may be configured to validate each signaling state in the plurality of sequentially occurring signaling states based on duration of the each signaling state. Counting of the sequences of transitions may be reset or restarted when one of the plurality of sequentially occurring signaling states is determined to be invalid.

In one aspect, the processing circuit 1202 is coupled to an imaging device and includes a bus interface circuit configured to communicatively couple the processing circuit 1202 to the imaging device over a multidrop differential serial link 1212, detector circuits configured to detect a plurality of sequentially occurring signaling states of the multidrop differential serial link 1212, and a controller. The plurality of sequentially occurring signaling states may be related to or indicative of transmissions of data packets over the multidrop differential serial link 1212. The controller may be configured to discard data packets received after the imaging device is powered on or initialized and until the imaging device is indicated to be in an active operating state, count sequences of transitions between a first signaling state of the multidrop differential serial link 1212 and a second signaling state of the multidrop differential serial link 1212, and indicate that the imaging device is in the active operating state after a preconfigured number (N) of data packets have been discarded.

In some implementations, the first signaling state indicates a beginning of high-speed transmission over the multidrop differential serial link 1212. The second signaling state may indicate a termination of high-speed transmission over the multidrop differential serial link 1212. The first signaling state may correspond to an LP-000 signaling state defined by a protocol specified by the MIPI Alliance, and the second signaling state may correspond to an LP-111 signaling state defined by the protocol specified by the MIPI Alliance. A data packet may be received over the multidrop differential serial link 1212 between each transition from the first signaling state of to the second signaling state.

In some examples, the number of data packets to be discarded is defined based on manufacturer specifications for the imaging device. The number of data packets to be discarded may be defined based on calibration or empirical results obtained from initialization of the imaging device.

In certain implementations, the detector circuits are further configured to validate each signaling state in the plurality of sequentially occurring signaling states based on duration of the each signaling state. The controller may be further configured to reset counting of the sequences of transitions when one of the plurality of sequentially occurring signaling states is determined to be invalid.

The processor-readable storage medium 1218 may include instructions that, when executed by a processing circuit 1202, causes the processing circuit 1202 to configure a bus interface circuit to communicatively couple the processing circuit 1202 to an imaging device over a multidrop differential serial link 1212, detect a plurality of sequentially occurring signaling states of the multidrop differential serial link 1212, the plurality of sequentially occurring signaling states related to transmissions of data packets over the multidrop differential serial link 1212, discard data packets received after the imaging device is powered on or initialized and until the imaging device is indicated to be in an active operating state, count sequences of transitions between a first signaling state of the multidrop differential serial link 1212 and a second signaling state of the multidrop differential serial link 1212, and indicate that the imaging device is in the active operating state after a preconfigured number (N) of data packets have been discarded.

In certain implementations, the first signaling state indicates a beginning of high-speed transmission over the multidrop differential serial link 1212, and the second signaling state indicates a termination of high-speed transmission over the multidrop differential serial link 1212. The first signaling state may correspond to an LP-000 signaling state defined by a protocol specified by the MIPI Alliance. The second signaling state may correspond to an LP-111 signaling state defined by the protocol specified by the MIPI Alliance. A data packet may be received over the multidrop differential serial link 1212 between each transition from the first signaling state of to the second signaling state.

In some examples, the number of data packets to be discarded is defined based on manufacturer specifications for the imaging device. The number of data packets to be discarded may be defined based on calibration or empirical results obtained from initialization of the imaging device.

In some implementations, the instructions further cause the processing circuit 1202 to validate each signaling state in the plurality of sequentially occurring signaling states based on duration of the each signaling state and reset counting of the sequences of transitions when one of the plurality of sequentially occurring signaling states is determined to be invalid.

Some implementation examples are described in the following numbered clauses:

1. A processing circuit coupled to an imaging device, comprising: a bus interface circuit configured to communicatively couple the processing circuit to the imaging device over a multidrop differential serial link; detector circuits configured to detect a plurality of sequentially occurring signaling states of the multidrop differential serial link, the plurality of sequentially occurring signaling states related to transmissions of data packets over the multidrop differential serial link; and a controller configured to: discard data packets received after the imaging device is powered on or initialized and until the imaging device is indicated to be in an active operating state; count sequences of transitions between a first signaling state of the multidrop differential serial link and a second signaling state of the multidrop differential serial link; and indicate that the imaging device is in the active operating state after a preconfigured number (N) of data packets have been discarded.
2. The processing circuit as described in clause 1, wherein the first signaling state indicates a beginning of high-speed transmission over the multidrop differential serial link, and wherein the second signaling state indicates a termination of high-speed transmission over the multidrop differential serial link.
3. The processing circuit as described in clause 2, wherein the first signaling state corresponds to an LP-000 signaling state defined by a protocol specified by the Mobile Industry Processor Interface (MIPI) Alliance, and wherein the second signaling state corresponds to an LP-111 signaling state defined by the protocol specified by the MIPI Alliance.
4. The processing circuit as described in clause 2 or clause 3, wherein a data packet is received over the multidrop differential serial link between each transition from the first signaling state of to the second signaling state.
5. The processing circuit as described in any of clauses 1-4, wherein the number of data packets to be discarded is defined based on manufacturer specifications for the imaging device.
6. The processing circuit as described in any of clauses 1-5, wherein the number of data packets to be discarded is defined based on calibration or empirical results obtained from initialization of the imaging device.
7. The processing circuit as described in any of clauses 1-6, wherein the detector circuits are further configured to validate each signaling state in the plurality of sequentially occurring signaling states based on duration of the each signaling state, and wherein the controller is further configured to reset counting of the sequences of transitions when one of the plurality of sequentially occurring signaling states is determined to be invalid.
8. A method for operating a processing circuit coupled to an imaging device, comprising: configuring a bus interface circuit to communicatively couple the processing circuit to the imaging device over a multidrop differential serial link; detecting a plurality of sequentially occurring signaling states of the multidrop differential serial link, the plurality of sequentially occurring signaling states related to transmissions of data packets over the multidrop differential serial link; discarding data packets received after the imaging device is powered on or initialized and until the imaging device is indicated to be in an active operating state; counting sequences of transitions between a first signaling state of the multidrop differential serial link and a second signaling state of the multidrop differential serial link; and indicating that the imaging device is in the active operating state after a preconfigured number (N) of data packets have been discarded.
9. The method as described in clause 8, wherein the first signaling state indicates a beginning of high-speed transmission over the multidrop differential serial link, and wherein the second signaling state indicates a termination of high-speed transmission over the multidrop differential serial link.
10. The method as described in clause 9, wherein the first signaling state corresponds to an LP-000 signaling state defined by a protocol specified by the Mobile Industry Processor Interface (MIPI) Alliance, and wherein the second signaling state corresponds to an LP-111 signaling state defined by the protocol specified by the MIPI Alliance.
11. The method as described in clause 9 or clause 10, wherein a data packet is received over the multidrop differential serial link between each transition from the first signaling state of to the second signaling state.
12. The method as described in any of clauses 8-11, wherein the number of data packets to be discarded is defined based on manufacturer specifications for the imaging device.
13. The method as described in any of clauses 8-12, wherein the number of data packets to be discarded is defined based on calibration or empirical results obtained from initialization of the imaging device.
14. The method as described in any of clauses 8-13, further comprising: validating each signaling state in the plurality of sequentially occurring signaling states based on duration of the each signaling state; and resetting counting of the sequences of transitions when one of the plurality of sequentially occurring signaling states is determined to be invalid.
15. An apparatus, comprising: means for configuring a bus interface circuit to communicatively couple the apparatus to an imaging device over a multidrop differential serial link; means for detecting a plurality of sequentially occurring signaling states of the multidrop differential serial link, the plurality of sequentially occurring signaling states related to transmissions of data packets over the multidrop differential serial link; and means for counting sequences of transitions between a first signaling state of the multidrop differential serial link and a second signaling state of the multidrop differential serial link, wherein data packets received after the imaging device is powered on or initialized are discarded until the imaging device is indicated to be in an active operating state, and wherein the imaging device is indicated to be in the active operating state after a preconfigured number (N) of data packets have been discarded.
16. The apparatus as described in clause 15, wherein the first signaling state indicates a beginning of high-speed transmission over the multidrop differential serial link, and wherein the second signaling state indicates a termination of high-speed transmission over the multidrop differential serial link.

17. The apparatus as described in clause 16, wherein the first signaling state corresponds to an LP-000 signaling state defined by a protocol specified by the Mobile Industry Processor Interface (MIPI) Alliance, and wherein the second signaling state corresponds to an LP-111 signaling state defined by the protocol specified by the MIPI Alliance.

18. The apparatus as described in clause 16 or clause 17, wherein a data packet is received over the multidrop differential serial link between each transition from the first signaling state of to the second signaling state.

19. The apparatus as described in any of clauses 15-18, wherein the number of data packets to be discarded is defined based on manufacturer specifications for the imaging device.

20. The apparatus as described in any of clauses 15-19, wherein the number of data packets to be discarded is defined based on calibration or empirical results obtained from initialization of the imaging device.

21. The apparatus as described in any of clauses 15-20, wherein the means for detecting a plurality of sequentially occurring signaling is configured to validate each signaling state in the plurality of sequentially occurring signaling states based on duration of the each signaling state, and wherein counting of the sequences of transitions is reset when one of the plurality of sequentially occurring signaling states is determined to be invalid.

22. A processor-readable storage medium comprising code that, when executed by a processing circuit, causes the processing circuit to: configure a bus interface circuit to communicatively couple the processing circuit to an imaging device over a multidrop differential serial link; detect a plurality of sequentially occurring signaling states of the multidrop differential serial link, the plurality of sequentially occurring signaling states related to transmissions of data packets over the multidrop differential serial link; discard data packets received after the imaging device is powered on or initialized and until the imaging device is indicated to be in an active operating state; count sequences of transitions between a first signaling state of the multidrop differential serial link and a second signaling state of the multidrop differential serial link; and indicate that the imaging device is in the active operating state after a preconfigured number (N) of data packets have been discarded.

23. The processor-readable storage medium as described in clause 22, wherein the first signaling state indicates a beginning of high-speed transmission over the multidrop differential serial link, and wherein the second signaling state indicates a termination of high-speed transmission over the multidrop differential serial link.

24. The processor-readable storage medium as described in clause 23, wherein the first signaling state corresponds to an LP-000 signaling state defined by a protocol specified by the Mobile Industry Processor Interface (MIPI) Alliance, and wherein the second signaling state corresponds to an LP-111 signaling state defined by the protocol specified by the MIPI Alliance.

25. The processor-readable storage medium as described in clause 23 or clause 24, wherein a data packet is received over the multidrop differential serial link between each transition from the first signaling state of to the second signaling state.

26. The processor-readable storage medium as described in any of clauses 22-25, wherein the number of data packets to be discarded is defined based on manufacturer specifications for the imaging device.

27. The processor-readable storage medium as described in any of clauses 22-26, wherein the number of data packets to be discarded is defined based on calibration or empirical results obtained from initialization of the imaging device.

28. The processor-readable storage medium as described in any of clauses 22-27, wherein the code further causes the processing circuit to: validate each signaling state in the plurality of sequentially occurring signaling states based on duration of the each signaling state; and reset counting of the sequences of transitions when one of the plurality of sequentially occurring signaling states is determined to be invalid.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A processing circuit coupled to an imaging device, comprising:
a bus interface circuit configured to communicatively couple the processing circuit to the imaging device over a multidrop differential serial link;
detector circuits configured to detect a plurality of sequentially occurring signaling states of the multidrop differential serial link, the plurality of sequentially occurring signaling states related to transmissions of data packets over the multidrop differential serial link; and
a controller configured to:
discard data packets received after the imaging device is powered on or initialized and until the imaging device is indicated to be in an active operating state;

count sequences of transitions between a first signaling state of the multidrop differential serial link and a second signaling state of the multidrop differential serial link; and indicate that the imaging device is in the active operating state after a preconfigured number (N) of data packets have been discarded.

2. The processing circuit of claim 1, wherein the first signaling state indicates a beginning of high-speed transmission over the multidrop differential serial link, and wherein the second signaling state indicates a termination of high-speed transmission over the multidrop differential serial link.

3. The processing circuit of claim 2, wherein the first signaling state corresponds to an LP-000 signaling state defined by a protocol specified by the Mobile Industry Processor Interface (MIPI) Alliance, and wherein the second signaling state corresponds to an LP-111 signaling state defined by the protocol specified by the MIPI Alliance.

4. The processing circuit of claim 2, wherein a data packet is received over the multidrop differential serial link between each transition from the first signaling state of to the second signaling state.

5. The processing circuit of claim 1, wherein the number of data packets to be discarded is defined based on manufacturer specifications for the imaging device.

6. The processing circuit of claim 1, wherein the number of data packets to be discarded is defined based on calibration or empirical results obtained from initialization of the imaging device.

7. The processing circuit of claim 1, wherein the detector circuits are further configured to validate each signaling state in the plurality of sequentially occurring signaling states based on duration of the each signaling state, and wherein the controller is further configured to reset counting of the sequences of transitions when one of the plurality of sequentially occurring signaling states is determined by the detector circuits to be invalid.

8. A method for operating a processing circuit coupled to an imaging device, comprising:
configuring a bus interface circuit to communicatively couple the processing circuit to the imaging device over a multidrop differential serial link;
detecting a plurality of sequentially occurring signaling states of the multidrop differential serial link, the plurality of sequentially occurring signaling states related to transmissions of data packets over the multidrop differential serial link;
discarding data packets received after the imaging device is powered on or initialized and until the imaging device is indicated to be in an active operating state;
counting sequences of transitions between a first signaling state of the multidrop differential serial link and a second signaling state of the multidrop differential serial link; and
indicating that the imaging device is in the active operating state after a preconfigured number (N) of data packets have been discarded.

9. The method of claim 8, wherein the first signaling state indicates a beginning of high-speed transmission over the multidrop differential serial link, and wherein the second signaling state indicates a termination of high-speed transmission over the multidrop differential serial link.

10. The method of claim 9, wherein the first signaling state corresponds to an LP-000 signaling state defined by a protocol specified by the Mobile Industry Processor Interface (MIPI) Alliance, and wherein the second signaling state corresponds to an LP-111 signaling state defined by the protocol specified by the MIPI Alliance.

11. The method of claim 9, wherein a data packet is received over the multidrop differential serial link between each transition from the first signaling state of to the second signaling state.

12. The method of claim 8, wherein the number of data packets to be discarded is defined based on manufacturer specifications for the imaging device.

13. The method of claim 8, wherein the number of data packets to be discarded is defined based on calibration or empirical results obtained from initialization of the imaging device.

14. The method of claim 8, further comprising:
validating each signaling state in the plurality of sequentially occurring signaling states based on duration of the each signaling state; and
resetting counting of the sequences of transitions when one of the plurality of sequentially occurring signaling states is determined to be invalid.

15. An apparatus, comprising:
means for configuring a bus interface circuit to communicatively couple the apparatus to an imaging device over a multidrop differential serial link;
means for detecting a plurality of sequentially occurring signaling states of the multidrop differential serial link, the plurality of sequentially occurring signaling states related to transmissions of data packets over the multidrop differential serial link; and
means for counting sequences of transitions between a first signaling state of the multidrop differential serial link and a second signaling state of the multidrop differential serial link,
wherein data packets received after the imaging device is powered on or initialized are discarded until the imaging device is indicated to be in an active operating state, and
wherein the imaging device is indicated to be in the active operating state after a preconfigured number (N) of data packets have been discarded.

16. The apparatus of claim 15, wherein the first signaling state indicates a beginning of high-speed transmission over the multidrop differential serial link, and wherein the second signaling state indicates a termination of high-speed transmission over the multidrop differential serial link.

17. The apparatus of claim 16, wherein the first signaling state corresponds to an LP-000 signaling state defined by a protocol specified by the Mobile Industry Processor Interface (MIPI) Alliance, and wherein the second signaling state corresponds to an LP-111 signaling state defined by the protocol specified by the MIPI Alliance.

18. The apparatus of claim 16, wherein a data packet is received over the multidrop differential serial link between each transition from the first signaling state of to the second signaling state.

19. The apparatus of claim 15, wherein the number of data packets to be discarded is defined based on manufacturer specifications for the imaging device.

20. The apparatus of claim 15, wherein the number of data packets to be discarded is defined based on calibration or empirical results obtained from initialization of the imaging device.

21. The apparatus of claim 15, wherein the means for detecting a plurality of sequentially occurring signaling is configured to validate each signaling state in the plurality of sequentially occurring signaling states based on duration of the each signaling state, and wherein counting of the sequences of transitions is reset when one of the plurality of sequentially occurring signaling states is determined to be invalid.

22. A non-transitory processor-readable storage medium comprising code that, when executed by a processing circuit, causes the processing circuit to:
   configure a bus interface circuit to communicatively couple the processing circuit to an imaging device over a multidrop differential serial link;
   detect a plurality of sequentially occurring signaling states of the multidrop differential serial link, the plurality of sequentially occurring signaling states related to transmissions of data packets over the multidrop differential serial link;
   discard data packets received after the imaging device is powered on or initialized and until the imaging device is indicated to be in an active operating state;
   count sequences of transitions between a first signaling state of the multidrop differential serial link and a second signaling state of the multidrop differential serial link; and
   indicate that the imaging device is in the active operating state after a preconfigured number (N) of data packets have been discarded.

23. The non-transitory processor-readable storage medium of claim 22, wherein the first signaling state indicates a beginning of high-speed transmission over the multidrop differential serial link, and wherein the second signaling state indicates a termination of high-speed transmission over the multidrop differential serial link.

24. The non-transitory processor-readable storage medium of claim 23, wherein the first signaling state corresponds to an LP-000 signaling state defined by a protocol specified by the Mobile Industry Processor Interface (MIPI) Alliance, and wherein the second signaling state corresponds to an LP-111 signaling state defined by the protocol specified by the MIPI Alliance.

25. The non-transitory processor-readable storage medium of claim 23, wherein a data packet is received over the multidrop differential serial link between each transition from the first signaling state of to the second signaling state.

26. The non-transitory processor-readable storage medium of claim 22, wherein the number of data packets to be discarded is defined based on manufacturer specifications for the imaging device.

27. The non-transitory processor-readable storage medium of claim 22, wherein the number of data packets to be discarded is defined based on calibration or empirical results obtained from initialization of the imaging device.

28. The non-transitory processor-readable storage medium of claim 22, wherein the code further causes the processing circuit to:
   validate each signaling state in the plurality of sequentially occurring signaling states based on duration of the each signaling state; and
   reset counting of the sequences of transitions when one of the plurality of sequentially occurring signaling states is determined to be invalid.

* * * * *